United States Patent
Yuan et al.

(10) Patent No.: US 12,120,708 B2
(45) Date of Patent: Oct. 15, 2024

(54) METHOD, DEVICE AND COMPUTER READABLE MEDIA FOR SLOT FORMAT CONFIGURATION

(71) Applicant: NEC CORPORATION, Tokyo (JP)

(72) Inventors: Fang Yuan, Beijing (CN); Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 607 days.

(21) Appl. No.: 17/276,923

(22) PCT Filed: Sep. 19, 2018

(86) PCT No.: PCT/CN2018/106570
§ 371 (c)(1),
(2) Date: Mar. 17, 2021

(87) PCT Pub. No.: WO2020/056648
PCT Pub. Date: Mar. 26, 2020

(65) Prior Publication Data
US 2021/0377936 A1  Dec. 2, 2021

(51) Int. Cl.
*H04W 72/27* (2023.01)
*H04W 72/0446* (2023.01)

(52) U.S. Cl.
CPC ....... *H04W 72/27* (2023.01); *H04W 72/0446* (2013.01)

(58) Field of Classification Search
CPC .............. H04W 72/27; H04W 72/0446; H04B 7/15542; H04L 5/0053; H04L 5/1469; H04L 5/0094
See application file for complete search history.

(56) References Cited

U.S. PATENT DOCUMENTS

| | | | | |
|---|---|---|---|---|
| 2012/0163335 A1* | 6/2012 | Chung | ......... | H04L 5/0023 370/329 |
| 2012/0327843 A1* | 12/2012 | Kim | ......... | H04B 7/14 370/315 |

(Continued)

FOREIGN PATENT DOCUMENTS

| | | |
|---|---|---|
| CN | 1889717 A | 1/2007 |
| CN | 1901748 A | 1/2007 |

(Continued)

OTHER PUBLICATIONS

International Search Report for PCT/CN2018/106570 dated Jun. 25, 2019 (PCT/ISA/210).

(Continued)

*Primary Examiner* — Dinh Nguyen

(57) ABSTRACT

Embodiments of the present disclosure relate to a method, device and computer readable medium for slot format configuration. In an embodiment of the present disclosure, a method for slot format configuration is performed at a network device. In the method, link configuration information is transmitted, wherein the link configuration indicates configuration for access and backhaul links for a time period; and slot format configuration information is transmitted, wherein the slot format configuration information indicates one or more slot formats for at least one of the access and backlinks to be used in the configuration for access and backhaul links for the time period.

22 Claims, 17 Drawing Sheets

| | 0 | 1 | 2~N-2 | N-1 | N |
|---|---|---|---|---|---|
| 1 | G1 | D | X | D | G2 |
| 2 | G1 | U | X | D | G2 |
| 3 | G1 | D | X | U | G2 |
| 4 | G1 | U | X | U | G2 |

(56) References Cited

U.S. PATENT DOCUMENTS

| | | | | |
|---|---|---|---|---|
| 2015/0333886 | A1* | 11/2015 | Seo | H04L 5/0051 370/329 |
| 2017/0064731 | A1* | 3/2017 | Wang | H04W 72/1263 |
| 2018/0124815 | A1 | 5/2018 | Papasakellariou | |
| 2018/0227922 | A1 | 8/2018 | Lee et al. | |

FOREIGN PATENT DOCUMENTS

| | | | |
|---|---|---|---|
| CN | 101150360 A | * | 3/2008 |
| CN | 103458512 A | | 12/2013 |
| EP | 3648529 A1 | | 5/2020 |
| JP | 2017-528934 A | | 9/2017 |
| WO | 2018145019 A1 | | 8/2018 |

OTHER PUBLICATIONS

Written Opinion for PCT/CN2018/106570 dated Jun. 25, 2019 (PCT/ISA/237).

Japanese Office Action for JP Application No. 2021-515190 mailed on Jul. 5, 2022 with English Translation.

Japanese Office Action for JP Application No. 2021-515190 mailed on Dec. 20, 2022 with English Translation.

Intel Corporation, "PHY layer enhancement for NR IAB", 3GPP TSG RAN WG1 #93, R1-1806551, May 12, 2018.

Australian Office Action for AU Application No. 2018441785 mailed on Nov. 5, 2021.

Extended European Search Report for EP Application No. EP18934238.9 dated on Aug. 18, 2021.

LG Electronics, "Discussions on NR IAB support", 3GPP TSG RAN WG1 Meeting #92bis, R1-1804583, Apr. 16-20, 2018, China, pp. 1/9-9/9.

CATT, "NR Physical Layer design for IAB backhaul link", 3GPP TSG RAN WG1 Meeting #94, R1-1808398, Aug. 20-24, 2018, Sweden.

Lenovo et al., "Discussion on resource partitioning for IAB network", 3GPP TSG RAN WG1 Meeting #94, R1-1808551, Aug. 20-24, 2018, Sweden.

CN Office Action for CN Application No. 201880097801.0, mailed on Dec. 23, 2023 with English Translation.

* cited by examiner

| Format | \multicolumn{14}{c}{Symbol number in a slot} |
| --- | --- | --- | --- | --- | --- | --- | --- | --- | --- | --- | --- | --- | --- | --- |
|  | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | F | U | U | U |
| 26 | D | D | F | F | F | F | F | F | F | F | F | U | U | U |
| 27 | D | D | D | F | F | F | F | F | F | F | F | U | U | U |
| 28 | D | D | D | D | D | D | D | D | D | D | D | D | F | U |
| 29 | D | D | D | D | D | D | D | D | D | D | D | F | F | U |
| 30 | D | D | D | D | D | D | D | D | D | D | F | F | F | U |
| 31 | D | D | D | D | D | D | D | D | D | D | D | F | U | U |
| 32 | D | D | D | D | D | D | D | D | D | D | F | F | U | U |
| 33 | D | D | D | D | D | D | D | D | D | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | D | F | U | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | D | F | F | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56 – 254 | \multicolumn{14}{c}{Reserved} |
| 255 | \multicolumn{14}{c}{UE determines the slot format for the slot based on TDD-UL-DL-ConfigurationCommon, or TDD-UL-DL-ConfigDedicated and, if any, on detected DCI formats} |

SFI indicates slot format configuration for an activated link configuration

|   | 0  | 1 | 2~N-2 | N-1 | N  |
|---|----|---|-------|-----|----|
| 1 | G1 | D | X     | D   | G2 |
| 2 | G1 | U | X     | D   | G2 |
| 3 | G1 | D | X     | U   | G2 |
| 4 | G1 | U | X     | U   | G2 |

|   | 0 | 1 | 2~N-2 | N-1 | N |
|---|---|---|-------|-----|---|
| 1 | G | D | X     | D   | G |
| 2 | G | U | X     | D   | G |
| 3 | G | D | X     | U   | G |
| 4 | G | U | X     | U   | G |

| F |   |   |   |   |   |   |   |   |   |   | F |
|---|---|---|---|---|---|---|---|---|---|---|---|
| F | F |   |   |   |   |   |   |   |   | F | F |
| F | F | F |   |   |   |   |   |   | F | F | F |
| F | F | F | F |   |   |   |   | F | F | F | F |

|   | 0    | 1 | 2~N-2 | N-1 | N    |
|---|------|---|-------|-----|------|
| 1 | 0.5F | D | X     | D   | 0.5F |
| 2 | 0.5F | U | X     | D   | 0.5F |
| 3 | 0.5F | D | X     | U   | 0.5F |
| 4 | 0.5F | U | X     | U   | 0.5F |

|   | 0  | 1 | 2~N-2 | N-1 | N  |
|---|----|---|-------|-----|----|
| 5 | D  | D | X     | D   | G2 |
| 6 | D  | D | X     | U   | G2 |
| 7 | G1 | D | X     | U   | U  |
| 8 | G1 | U | X     | U   | U  |

| AL ending symbol | BH starting symbol | BH ending symbol | AL starting symbol |
|------------------|--------------------|------------------|--------------------|
| T                | R                  | R                | T                  |
| R                | T                  | T                | R                  |

|   | 0  | 1  | 2~N-2 | N-1 | N  |
|---|----|----|-------|-----|----|
| 1 | G1 | D  | D     | D   | G2 |
| 2 | G1 | U  | U     | U   | G2 |

| AL ending symbol | | BH starting symbol | | Comment |
|---|---|---|---|---|
| T | D | R | F,D | Due to switching |
| | D | T | F,U | Due to CLI and TA |
| R | U | T | F,U | Due to switching + TA |
| | U | R | (F), D | If panel switching>delay |

| BH ending symbol | | AL starting symbol | | Comment |
|---|---|---|---|---|
| RX | D, F | TX | D | Due to switching and delay |
| | D, F | RX | U | Due to CLI |
| TX | U, (F) | TX | D | If panel switching>delay |
| | U, F | RX | U | Due to switching |

METHOD, DEVICE AND COMPUTER READABLE MEDIA FOR SLOT FORMAT CONFIGURATION

CROSS REFERENCE TO RELATED APPLICATIONS

This application is a National Stage of International Application No. PCT/CN2018/106570 filed Sep. 19, 2018.

FIELD OF THE INVENTION

The non-limiting and exemplary embodiments of the present disclosure generally relate to the field of wireless communication techniques, and more particularly relate to a method, device and computer readable medium for slot format configuration in a wireless communication system.

BACKGROUND OF THE INVENTION

This section introduces aspects that may facilitate better understanding of the disclosure. Accordingly, the statements of this section are to be read in this light and are not to be understood as admissions about what is in the prior art or what is not in the prior art.

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

Amongst other, the NR system is desired to support wireless backhaul and relay links enabling flexible and very dense deployment of NR cells without the need for densifying the transport network proportionately. The larger bandwidth available for the NR system along with the native deployment of Massive Multiple Input and Multiple Output (MIMO) or multi-beam systems in the NR system creates an opportunity to develop integrated access and backhaul links. Example networks with such IAB links are shown in FIGS. 1A and 1B. As illustrated in FIG. 1a, a relay device 120 called as IAB-node is arranged between user equipment (UE) 130-2 and a base station 110 (called as an IAB-donor). The link between UE 130-2 and the IAB-node 120 is called as an access link including downlink (DL) access link and uplink (UL) access link, and the link between the IAB-node 120 and the IAB-donor 110 is called as backhaul links, including DL backhaul link and UL backhaul link. In the example network as illustrated in FIG. 1b, the IAB-node 220 is located between a parent node 210 (for example, an IAB-donor) and a child node 240 (for example, another IAB-node). The link between the IAB-node 220 and the IAB-donor 210 is called as parent backhaul links, including DL parent backhaul link and UL parent backhaul link, and the link between the IAB-node 220 and the child node 240 is called as child backhaul links including UL child backhaul link and DL child backhaul link Within such a network, the relay nodes could multiplex access and backhaul links in time, frequency, or space (e.g. beam-based operation).

In 3GPP RAN1 #94 meeting, IAB timing was agreed for at least case 1, wherein DL transmission timing is aligned across IAB-nodes and the IAB-donor nodes. In this meeting, it was also agreed to further study indication of resources within the configuration which can be dynamically and flexibly used for different links, including:

Considering the scheduling delay, IAB node processing delay, or information required to be available for use of flexible resources Mechanisms to schedule flexible resources (e.g. GC-PDCCH)

SUMMARY OF THE INVENTION

In general, example embodiments of the present disclosure provide a new solution for slot format configuration in a wireless communication system.

According to a first aspect of the present disclosure, there is provided a method for slot format configuration in a wireless communication system. The method may be implemented at a first network device like an IAB-donor or a parent node. The method may include transmitting link configuration information indicating a configuration for access and backhaul links for a time period and transmitting slot format configuration information indicating one or more slot formats for at least one of the access and backhaul links to be used in the configuration for access and backhaul links for the time period.

According to a second aspect of the present disclosure, there is provided a method for receiving slot format configuration in a wireless communication system. The method may be implemented at a second network device such as an IAB-node. The method may include receiving link configuration information indicating a configuration for access and backhaul links for a time period and receiving slot format configuration information indicating one or more slot formats for at least one of the access and backhaul links to be used in the configuration for access and backhaul links for the time period.

According to a third aspect of the present disclosure, there is provided a first network device. The first network device may be an IAB-donor or a parent node. The first network device may comprise at least one processor and at least one memory coupled with the at least one processor. The at least one memory has computer program codes stored therein which are configured to, when executed on the at least one processor, cause the first network device to perform operations of the first aspect.

According to a fourth aspect of the present disclosure, there is provided a second network device. The second network device may be for example an IAB-node. The second device may comprise at least one processor and at least one memory coupled with the at least one processor. The at least one memory has computer program codes stored therein which are configured to, when executed on the at least one processor, cause the second network device to perform operations of the second aspect.

According to a fifth aspect of the present disclosure, there is provided a computer-readable storage medium having a computer program stored thereon which, when executed by at least one processor of a device, causes the device to perform actions in the method according to any embodiment in the first aspect.

According to a sixth aspect of the present disclosure, there is provided a computer-readable storage medium having a computer program stored thereon which, when executed by at least one processor of a device, causes the device to perform actions in the method according to any embodiment in the second aspect.

According to a seventh aspect of the present disclosure, there is provided a computer program product comprising a computer-readable storage medium according to the fifth aspect.

According to an eighth aspect of the present disclosure, there is provided a computer program product comprising a computer-readable storage medium according to the sixth aspect.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 2 illustrates slot formats for normal cyclic prefix in the NR system;

FIGS. 3A and 3B schematically illustrate a slot-level resource allocation between backhaul and access links in the prior art;

DETAILED DESCRIPTION OF EMBODIMENTS

Figure 1A:
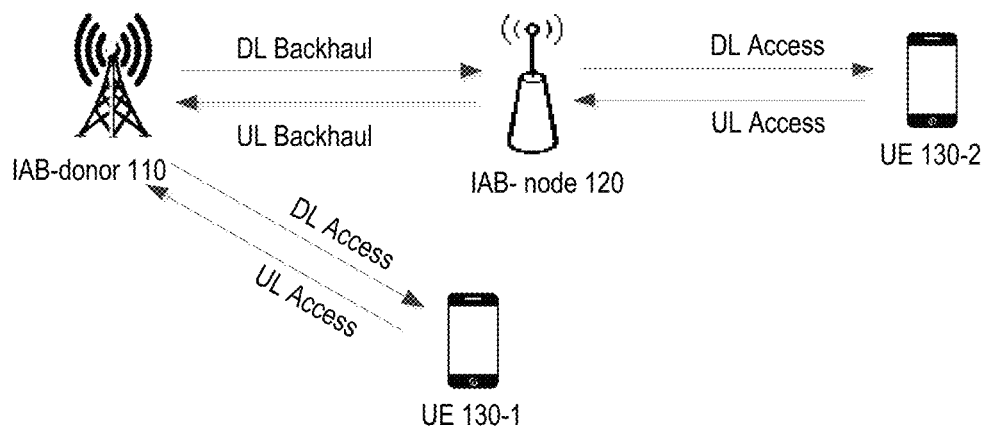
FIGS. 1A and 1B illustrates example networks with IAB links.

Hereinafter, the solutions as provided in the present disclosure will be described in details through embodiments with reference to the accompanying drawings. It should be appreciated that these embodiments are presented only to enable those skilled in the art to better understand and implement the present disclosure, not intended to limit the scope of the present disclosure in any manner. For example, features illustrated or described as part of one embodiment may be used with another embodiment to yield still a further embodiment. In the interest of clarity, not all features of an actual implementation are described in this specification.

In the accompanying drawings, various embodiments of the present disclosure are illustrated in block diagrams, flow charts and other diagrams. Each block in the flowcharts or blocks may represent a module, a program, or a part of code, which contains one or more executable instructions for performing specified logic functions, and in the present disclosure, a dispensable block is illustrated in a dotted line. Besides, although these blocks are illustrated in particular sequences for performing the steps of the methods, as a matter of fact, they may not necessarily be performed strictly according to the illustrated sequence. For example, they might be performed in reverse sequence or simultaneously, which is dependent on natures of respective operations. It should also be noted that block diagrams and/or each block in the flowcharts and a combination of thereof may be implemented by a dedicated hardware-based system for performing specified functions/operations or by a combination of dedicated hardware and computer instructions.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink (DL) transmission refers to a transmission from a network device to UE, or from a network device as a parent node to another network device as a child node, and an uplink (UL) transmission refers to a transmission in an opposite direction.

As mentioned above, the IAB technology was already introduced into the NR system. With the introduction of the IAB technology, switching between the access link and the backhaul link will occur at the IAB node. In the existing LTE system, the subframe configuration is fixed and thus one symbol can be punctured to use as a guard period. However, in the NR system, the slot format is rather flexible and it is more desirable to configure a flexible guard period.

Only for illustrative purposes, FIG. 2 illustrates example slot formats for normal cyclic prefix in the NR system. As illustrated in FIG. 2, there are 56 different formats (Formats 0 to 55) and the UE may also determine the slot format for the slot based on TDD-UL-DL-Configuration common parameter, or TDD-UL-DL-ConfigDedicated parameter, and based on, if any, detected DCI formats. Particularly, most of Formats 0 to 55 have one or more flexible symbols (indicated as "F" in FIG. 2), in addition to uplink and the downlink symbols (indicated as "U" and "D" respectively). Thus, due to the flexibility in slot formats, the switching scheme in the LTE system does not apply the NR system. For extended cyclic prefix, there are flexible slot formats analogous to those for normal cyclic prefix case.

Figures 3A, 3B:
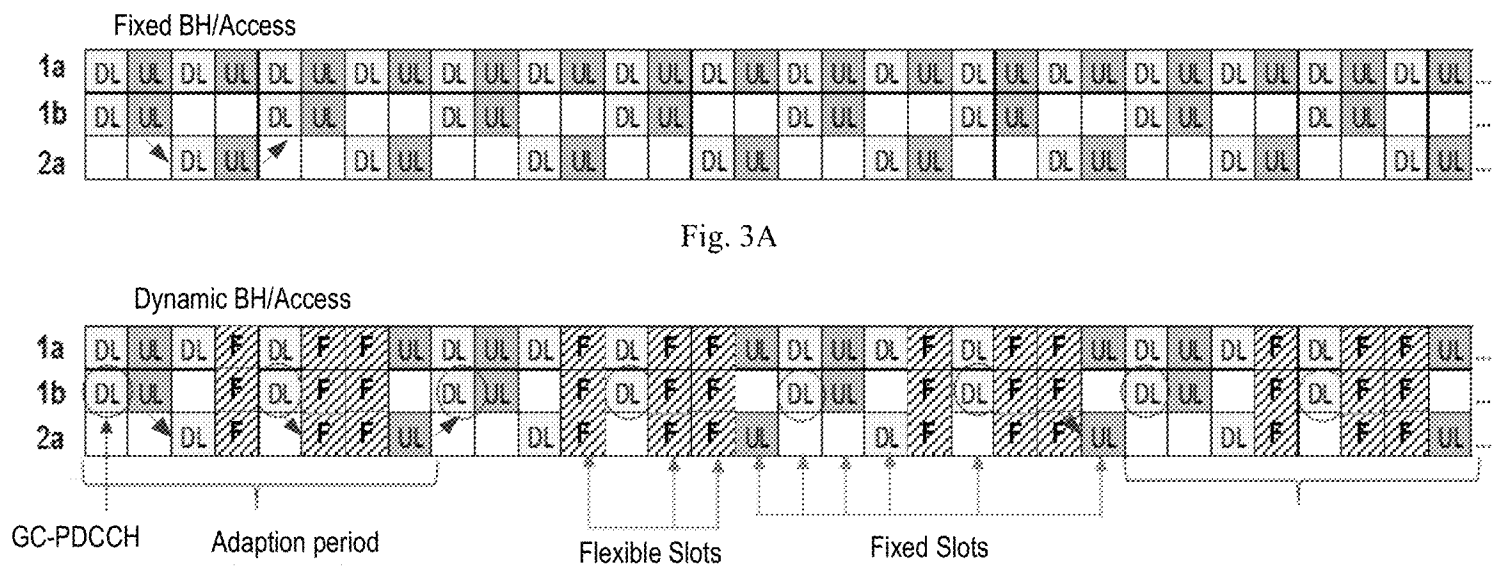

In 3GPP technical document R1-1808580, titled "Resource allocation between backhaul and access links," there is proposed a resource allocation for NR IAB system on a slot level. For illustrative purposes, FIGS. 3A and 3B illustrate fixed and dynamic backhaul and access resource allocations as proposed in this document, which "1a" indicates the access link between UE and BS, "1b" means the backhaul link between the BS as an IAB-donor and an IAB-node, and "2a" means the access link between the IAB-node and UE.

In the fixed backhaul and access resource allocation as illustrated in 3A, the resource allocation is fixed without any flexibility, wherein a slot is either a DL slot or an UL slot, and the access link 2a and the backhaul link 1b are allocated with resource alternatively and transmissions cannot be performed on the two links simultaneously. Amongst others, in the dynamic backhaul and access resource allocation as illustrated in 3B, in addition to some fixed slots, there are also some flexible slots indicated as "F", which may an UL slot or Dl slot. In the proposed resource allocation solution, resource is allocated at the slot level, which means the slot is either a DL or a UL slot.

However, in the NR system, more flexible slot formats are used, wherein many slot formats contain any of downlink, uplink or flexible symbols within a slot. In addition, the introduction of flexible slots in the proposed dynamic backhaul and access resource allocation causes some cases in which the IAB-node does not have any prior information about adjacent slots either. Thus, in such a case, the switching remains an issue.

Embodiments of the present disclosure provide a new solution for slot format configuration in a wireless communication to mitigate or at least alleviate at least one of the above problems. In embodiments of the present disclosure, a first network device transmit link configuration information to a second network device to indicate a configuration for access and backhaul links for a time period and the first network device may further transmit slot format configuration information to the second network device to indicate one or more slot formats for at least one of the access and backhaul links to be used in the configuration for access and backhaul links for the time period. Therefore, with embodiments of the present disclosure, resources for access and backhaul links are first indicated and then a slot format configuration is used to indicate the link configuration within these links (for example for the backhaul links). In such a way, it could achieve a slot-level link resource allocation for access and backhaul links while supporting flexible slot formats within respective links.

Figure 1B:
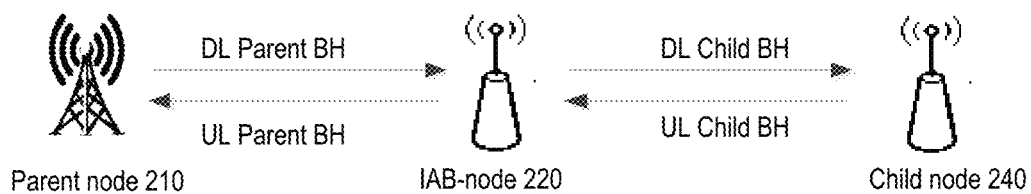

It shall be appreciated that in the present disclosure, especially in embodiments disclosed herein and also in the appended claims, backhaul link and access link are associated with an IAB node as a relay. In particular, the backhaul link refers to the link between the IAB node and IAB-donor or its parent IAB node, and the access link refers to the link between the IAB node and its child IAB node or UE. Especially, for the network topology as illustrated in FIG. 1B, the UL and DL parent backhaul links belong to the backhaul links while the DL and UL child backhaul links belong to the access links.

It shall also be appreciated that in the present disclosure, especially in embodiments disclosed herein and also in the appended claims, the first network device and the second network device refers to network devices associated with IAB technology. The first networks may be IAB-node or a parent node and the second network device may be IAB-node as a relay.

Hereinafter, reference will be further made to accompanying drawings to describe the solutions as proposed in the present disclosure in details. However, it shall be appreciated that the following embodiments are given only for illustrative purposes and the present disclosure is not limited thereto. It shall be also appreciated that slot format configuration for backhaul link will be taken as an example to describe the solution as proposed herein with reference to embodiments of the present disclosure. However, it is also possible to, additionally or alternatively, use the solution as proposed herein to indicate the slot format for the access link.

Figure 4:
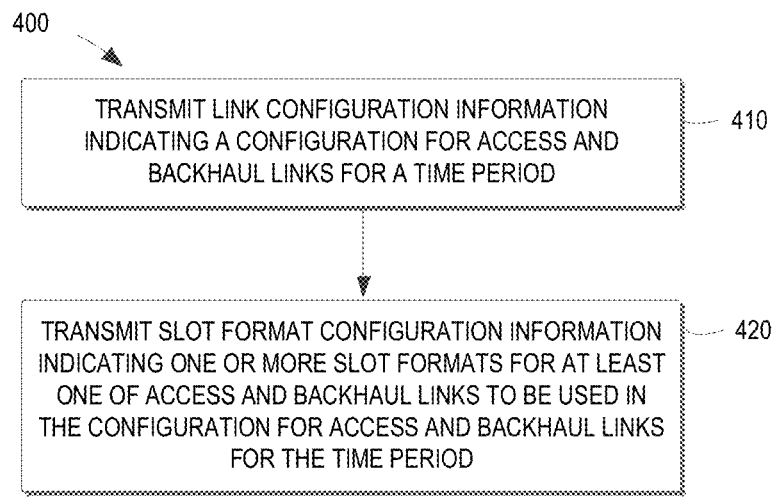
FIG. 4 schematically illustrates a flow chart of a method for slot format configuration at a first network device (for example at an IAB-donor or a parent node) in a wireless communication system according to some embodiments of the present disclosure.

FIG. 4 schematically illustrates a flow chart of a method for slot format configuration in a wireless communication system according to some embodiments of the present disclosure. The method 400 can be implemented at a first network device. The first network device could be an IAB-donor for the network topology as illustrated in FIG. 1A, a parent node (IAB-donor or another relay node) for the network topology as illustrated in FIG. 1B or any other network device.

As illustrated in FIG. 4, in step 410, the first network device may transmit link configuration information to indicate a configuration for access and backhaul links for a time period. The link configuration means resource allocation pattern for access and backhaul links for the time period. For example, the link configuration may indicate that each slot among all the slots in a time period of 1 ms is configured for an access link or a backhaul link. In other words, the link configuration can have a slot-level granularity and 1 ms adaptation period. The link configuration information is used to indicate the link configuration to the IAB-node for example the one functioning as a relay The link configuration information can be in a form of for example bitmap associated with the time period. For example, "0" in the bitmap indicates a slot for the access link, "1" in the bitmap indicates a slot for the backhaul link and vice versa. In some embodiments of the present disclosure, link configuration information in form of bitmap may be transmitted to the second network device like IAB-node to indicate the link configuration for access and backhaul link to be used during the time period.

Periodic backhaul or access link can be supported by the link configuration. For example, if only one "1" is contained in the bitmap, it means that one backhaul link transmission per the time period is configured. By setting more equally spaced "1" or "0" in the bitmap, the smaller periodic backhaul or access link can be configured.

In some embodiments of the present disclosure, the link configuration information can be informed to the second network device in two-layer signaling. For example, the link configuration may be indicated to the IAB-node as a relay by means of two signaling. First, a link configuration set indication can be transmitted to the second network device to indicate a set of available configurations for the access and backhaul links for a time period. Then, a link configuration activation indication may be further transmitted to the second network device to activate or change one of the set of available configurations for the time period. In this way, the link configuration can be adapted to different demands of traffic loads between access and backhaul links during different time periods. Hereinafter, reference will be made to FIGS. 5 to 6 to describe an example implementation of link configuration indication according to some embodiments of the present disclosure.

Figure 5:
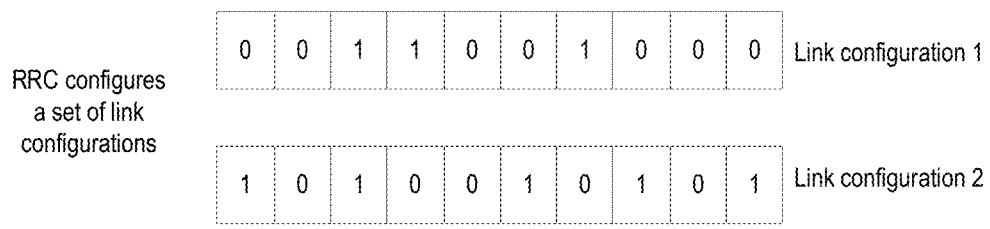
FIG. 5 schematically illustrates a set of link configurations in form of bitmaps according to some embodiments of the present disclosure.
Figure 6:
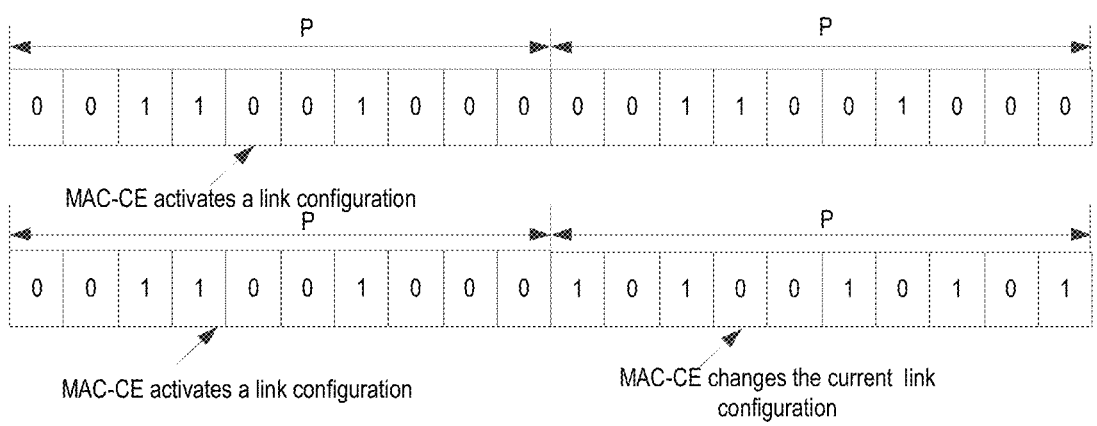
FIG. 6 schematically illustrates activated link configurations according to some embodiment of the present disclosure.

FIG. 5 illustrates a set of link configurations in form of bitmaps configured by Radio Resource Control signaling according to some embodiments of the present disclosure. As illustrated in FIG. 5, a set of link configurations are configured by RRC signaling, which includes a plurality of link configurations, link configuration 1 and link configuration 2. In the link configuration, "0" indicates a slot for an access link, and "1" indicates a slot for a backhaul link. For the above two link configurations in the set of link configurations, a MAC-CE can be further used to activate one of the link configurations so as to activate a link configuration to change the current link configuration, as indicated in FIG. 6. In such a way, the second network device could know the current link configuration, for example, which slot is an access link or which slot is a backhaul link.

Reference is further made back to FIG. 4, in step 420, the first network device may further transmit slot format configuration information to indicate one or more slot formats for at least one of the access and backhaul links to be used in the configuration for access and backhaul links for the time period. The slot format used herein denotes configuration for uplink and downlink for symbols within a slot. Only for illustrative purposes, some examples of slot formats could be found in FIG. 2. The slot format can be configured dynamically or semi-dynamically. For example, the slot format can be configured by means of downlink control channel. Group common physical downlink control channel (GC-PDCCH) is a robust control channel on which information could be transmitted accurately, and thus GC-PDCCH could be used to carry the slot format configuration information.

Figures 7, 8, 9, 10:
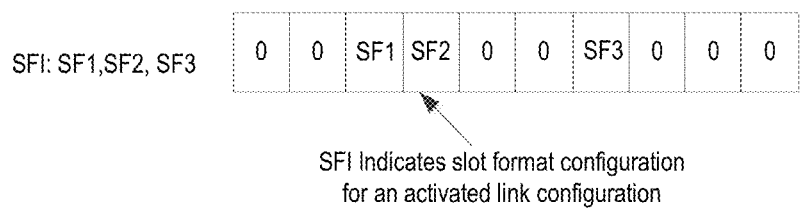
FIG. 7 schematically illustrates an example slot format configuration for an activated link configuration according to some embodiments of the present disclosure.
FIG. 8 schematically illustrates example slot format configurations for switching between access and backhaul links according to some embodiments of the present disclosure.
FIG. 9 schematically illustrates another example slot format configurations for switching between access and backhaul links according to some embodiments of the present disclosure.
FIG. 10 schematically illustrates example forms of slot format configurations for switching between access and backhaul links according to some embodiments of the present disclosure.

As illustrated in FIG. 7, SFI carried on GC-PDCCH indicates SF1, SF2, and SF3, which may indicate slot formats to be respectively used in the backhaul slot in the activated link configuration, configuration 1. It shall be appreciated that although FIG. 7 illustrates slot format for the backhaul links, it is also alternatively or additionally to indicate the slot formats for the access link. In some embodiments of the present disclosure, the slot formats SF1, SF2 and SF3 can be identical to each other; in some other embodiments of the present disclosure, at least some of SF1, SF2 and SF3 are different from others of SF1, SF2 and SF3.

In such a way, the first network device could inform the second network device of the slot format used in respective links so that they could perform data transmission/reception based on the link configuration and the indicated slot format. Thus, it is possible to allocate the resource link resource at the slot level by means of link configuration information and also support the flexible slot formats with the slot format configuration information.

In addition, to ensure switching between the backhaul link and the access link, a guard period may be set for, for example, a slot format for a backhaul link, For example, the first network device may configure the backhaul link with some specific slot formats.

FIG. 8 schematically illustrates example slot formats which can be used for backhaul links according to embodiments of the present disclosure, wherein G1 and G2 denote guard periods, "U" denotes an uplink symbol, "D" denotes a downlink symbol and "X" can be either a "U","D" or "F" symbol as in NR. As illustrated in FIG. 8, guard periods can be set at both starting symbol and ending symbol of a slot, wherein G1 and G2 may have same time length or different time length. By means of the slot formats, the switching can be performed smoothly while access link could be scheduled freely without considering the switching between access link and backhaul link. The guard period G1 or G2 each may have a fixed time length, for example, 20 μs. Or alternatively, the guard period G1 or G2 may have a variable time length. The time length may be dependent on subcarrier spacing (SCS) of OFDM system. For example, for SCS=15 KHz, G could be 1 OFDM symbol configured as "F" in the backhaul link; for SCS=30 KHz, G could be 1 to 2 OFDM symbol configured as "F" in the backhaul link; for SCS=15*$2^u$ KHz, G could be 1 to $2^u$ OFDM symbol configured as "F" in backhaul link, wherein F means a flexible OFDM symbol as defined in NR.

In some embodiments of the present disclosure, G1 have the same time length as G2. FIG. 9 schematically illustrates another example slot format configurations for switching between access and backhaul links according to some embodiments of the present disclosure. As illustrated in FIG. 9, these example slot formats can be used for backhaul link, wherein G denotes guard periods, "U" denotes an uplink symbol, "D" denotes a downlink symbol and "X" denotes "U","D" or "F". The guard period G may have a fixed time length; for example, G could be 1 OFDM symbol, e.g., configured as "F". Or alternatively, the guard period G may have a variable time length. Similarly, the guard period G may be dependent on subcarrier spacing. For example, for SCS=15 KHz, G could be 1 OFDM symbol configured as "F" in the backhaul link; for SCS=30 KHz, G could be 1 to 2 OFDM symbol configured as "F" in the backhaul link; for SCS=15*$2^u$ KHz, G could be 1 to $2^u$ OFDM symbol configured as "F" in backhaul link, wherein F means a flexible OFDM symbol as defined in NR. FIG. 10 illustrates example forms of slot format configurations for switching between access and backhaul links according to some embodiments of the present disclosure, wherein the guard period G could be 1F, 2F, 3F, or 4F.

Figures 11, 12, 13:
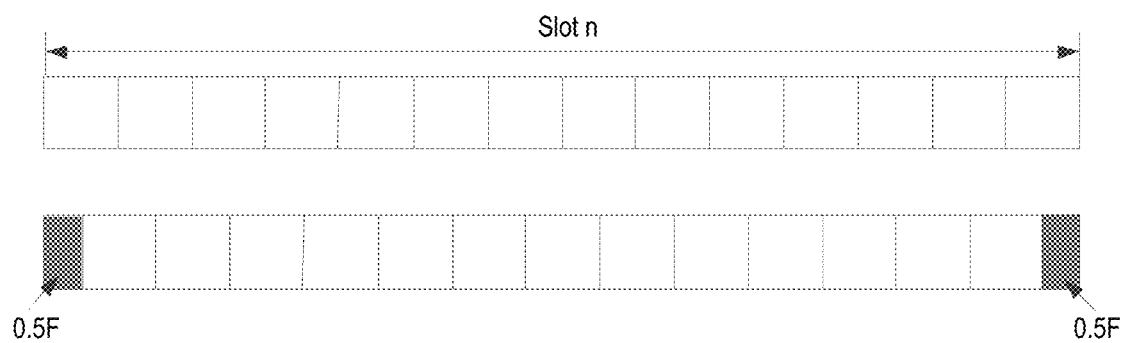
FIG. 11 schematically illustrates further example slot format configurations for switching between access and backhaul links according to some embodiments of the present disclosure.
FIG. 12 schematically illustrates example diagram of slot format configuration with two guard periods of 0.5F at a starting symbol and an ending symbol of a slot according to some embodiments of the present disclosure.
FIG. 13 schematically illustrates another example forms of slot format configurations for switching between access and backhaul links according to some embodiments of the present disclosure.

In some embodiments of the present disclosure, the guard period only occupies a part of symbol instead of one or more symbols. For example, G could be 0.5F as illustrated in FIG. 11. In such a case, 13 symbols are totally remaining for data transmission, as illustrated in FIG. 12.

In some embodiments of the present disclosure, G1 and G2 have different time lengths. In such a base, the slot formats could have example forms as illustrated in FIG. 13, wherein G1 might occupy flexible symbol one more than G2. It shall be appreciated that it is also possible that G1 occupies flexible symbols less than G2.

For the slot formats as illustrated in FIG. 8, guard periods are set at both starting and ending symbol of a slot for backhaul link and in such a case the preceding and following access link could be scheduled freely without considering the transmission direction of the first or last symbol of the backhaul link. In some embodiments of the present disclosure, the guard period could also be arranged at starting symbols or ending symbols within a slot.

Figure 14:
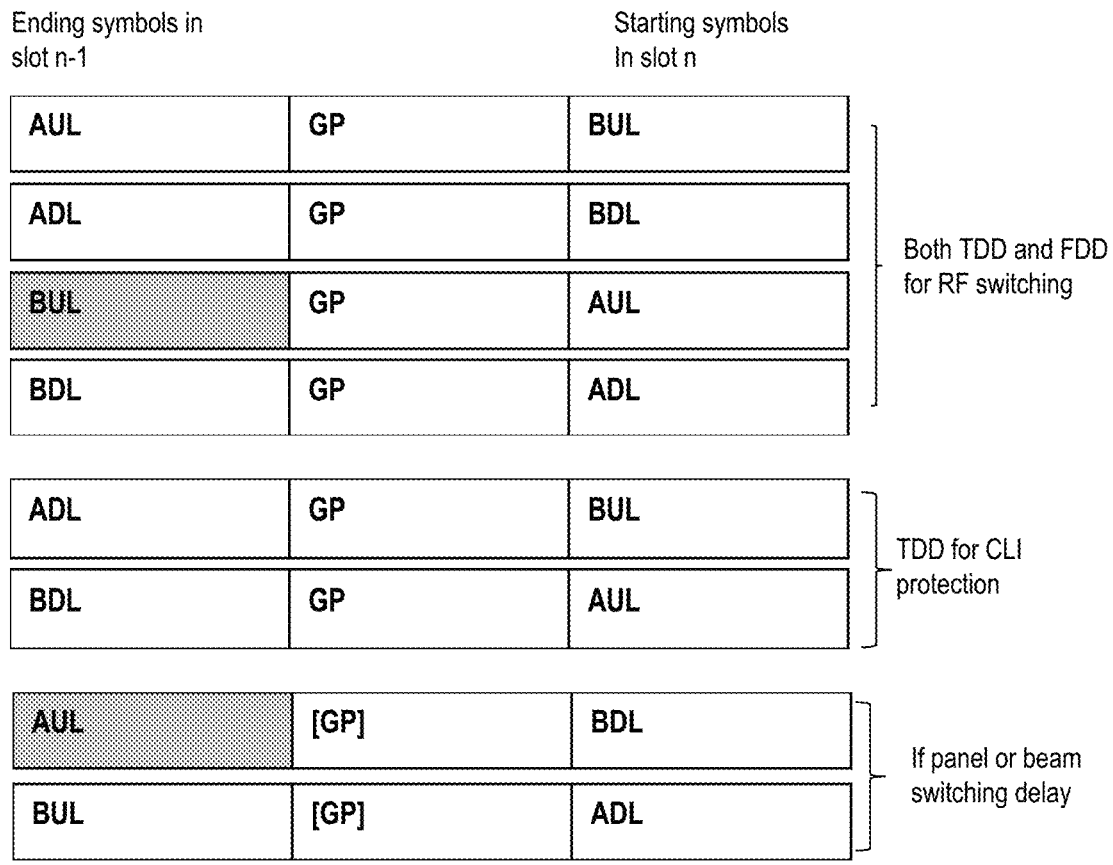
FIG. 14 schematically illustrates serval transmission cases in which guard period may be set within any of the access link slot or backhaul link slot according to some embodiments of the present disclosure.

FIG. 14 illustrates example transmission cases in which a guard period can be set within any of the access link slot or backhaul link slot As illustrated in FIG. 14, for the first group of cases, in both TDD and FDD modes, it involves switching between the reception and transmission at the second network device like IAB-node, which means RF switching; for the second group of cases, it involves switching either from transmission towards UE to transmission towards BS, or switching from reception from BS to reception from UE, which might cause cross-link interference (CLI) in TDD mode; for the third group of cases, it involves either from reception from UE to reception from BS or from transmission towards BS to transmission towards UE, which might require beam or panel switching (and thus cause a panel or beam switching delay). In these cases, it requires a guard period for RF switching, CLI protection, or panel or beam switching delay.

Figure 15:
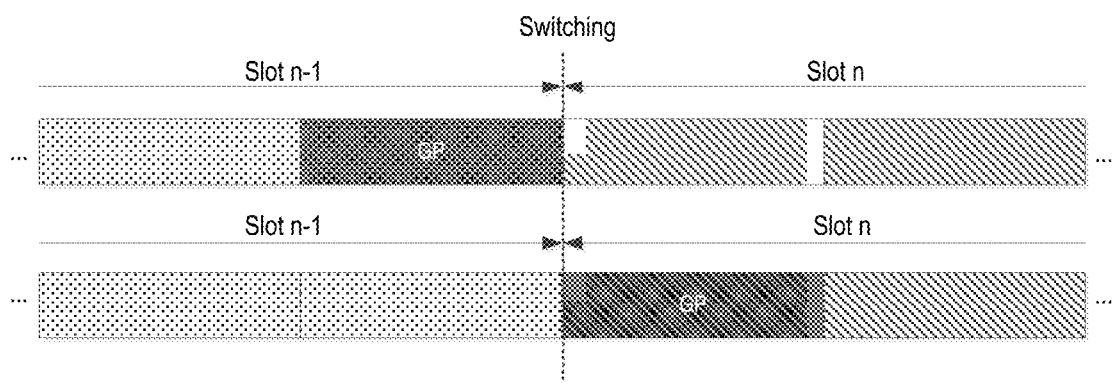
FIG. 15 schematically illustrates example guard period setting for transmission cases illustrated in FIG. 14 according to some embodiments of the present disclosure.
Figures 16, 17A, 17B, 17C:
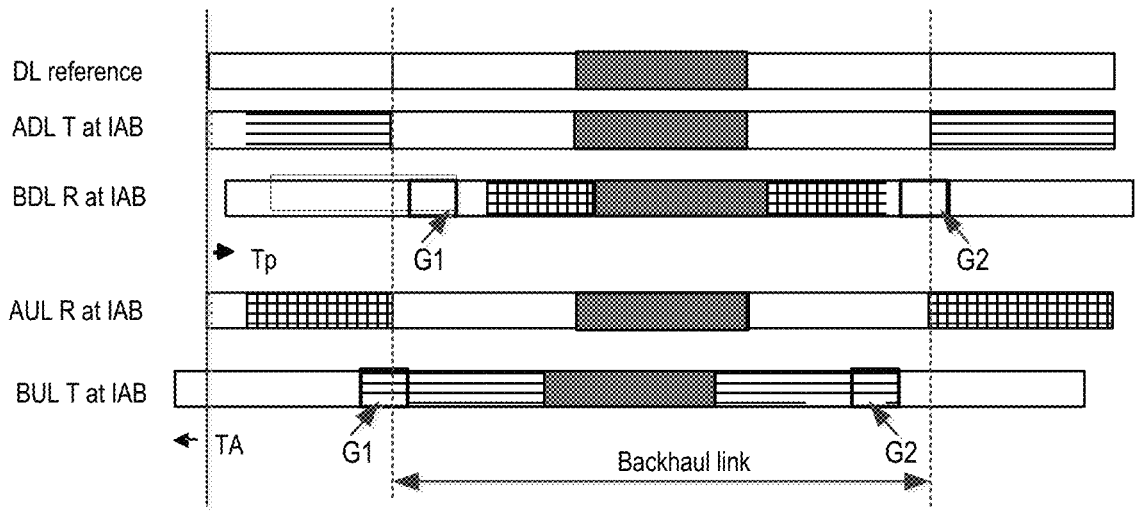
FIG. 16 schematically illustrates example slot format configurations for transmission cases illustrated in FIG. 14 according to some embodiments of the present disclosure.
FIG. 17A schematically illustrates example switching cases in Frequency Division Duplex (FDD) system according to some embodiments of the present disclosure.
FIG. 17B schematically illustrates example switching cases and guard period setting in FDD system according to some embodiments of the present disclosure.
FIG. 17C schematically illustrates example slot format configurations for switching between access and backhaul links in FDD system according to some embodiments of the present disclosure.

For the cases as illustrated in FIG. 14, the guard period could be set at the last symbol of the preceding slot n−1 or at the first symbol of the following slot, as illustrated in FIG. 15. FIG. 16 further illustrates example slot formats which can be used for these cases wherein G1 and G2 denote guard periods, "U" denotes an uplink symbol, "D" denotes a downlink symbol and "X" denotes a "U","D" or "F" symbol. Similarly the guard period G1 or G2 each may have a fixed time length. Or alternatively, the guard period G1 or G2 may have a variable time length. The time length may be dependent on subcarrier spacing. For example, for SCS=15 KHz, G could be 1 OFDM symbol configured as "F" in the backhaul link; for SCS=30 KHz, G could be 1 to 2 OFDM symbol configured as "F" in the backhaul link; for SCS=15*$2^u$ KHz, G could be 1 to $2^u$ OFDM symbol configured as "F" in backhaul link, wherein F means a flexible OFDM symbol as defined in NR.

FIGS. 17A to 17C illustrate an example solution for the slot format in FDD mode according some embodiments of the present disclosure. In the FDD mode, the access and backhaul uplinks share a radio frequency and the access and backhaul downlinks share another radio frequency. Thus, guard periods are required only during switching between access and backhaul uplinks or between access and backhaul downlinks.

FIG. 17A schematically illustrates four scenarios requiring guard periods in the slot format. The first one is switching when the access link (AL) ending symbol is for transmission "T" at the IAB-node and the backhaul link (BH) starting symbol is for reception "R" at the IAB-node. The second one is switching when the BH ending symbol is for reception "R" at the IAB-node and the AL starting symbol is for transmission "T" at the IAB-node. The third one is switching when the AL ending symbol is for reception "R" at the IAB-node and the BH starting symbol is for transmission "T" at the IAB-node. The fourth one is switching when the BH ending symbol is for transmission "T" at the IAB-node and the AL starting symbol is for reception "R" at the IAB-node.

FIG. 17B schematically illustrates example switching cases and guard period setting in FDD system according to some embodiments of the present disclosure. In such a case, the guard period could be set at starting symbols and ending symbols of the backhaul slot as indicated by the solid blocks illustrated in FIG. 17B. However, the actual guard period within a slot could be different. For the illustrated switching from the ADL T (access downlink transmission) to BDL R (backhaul downlink reception) at the IAB node as a relay, there is some time gap due to propagation delay between which could be used as a part of the guard time, and thus the actual guard time within the backhaul link slot will be reduced. On the contrary, for the illustrated switching from the BDL R back to the ADL T, there is some time overlapping due to propagation delay between which cannot be used as a part of the guard time and thus the actual guard time within the backlink slot will be increased. Similarly, for switching from AUL R (access uplink reception) to BUL T(backhaul uplink transmission), the actual guard time within the backlink slot will be increased if there is positive time advance for backhaul uplink transmission, while for switching from BUL T(backhaul uplink transmission) to AUL R (access uplink reception), the backlink slot will be reduced.

FIG. 17C schematically illustrates example slot formats which could be used for the backhaul link according to some embodiments of the present disclosure, wherein G1 and G2 denote guard periods, "U" denotes an uplink symbol, "D" denotes a downlink symbol. As illustrated in FIG. 17C, guard periods can be set at both starting symbol and ending symbol of a slot, wherein G1 and G2 may have same time length or different time length. Each of G1 and G2 could be have a fixed time length or have a time length which can be configured by a network device. The number of symbols for G1 and G2 could be dependent on SCS.

Herein after, guard periods in TDD system will be described. In the TDD mode, downlinks and uplinks share the transmission resources in time division mode. Thus, in TDD system, it might involve various time alignment modes and for different alignment modes, the guard period might be different. In other words, the guard period may have a time length dependent on the time alignment mode of the link transmission. Hereinafter, reference will be made to FIGS. 18A to 24B to describe these scenarios in details.

Figures 18A, 18B, 19A:
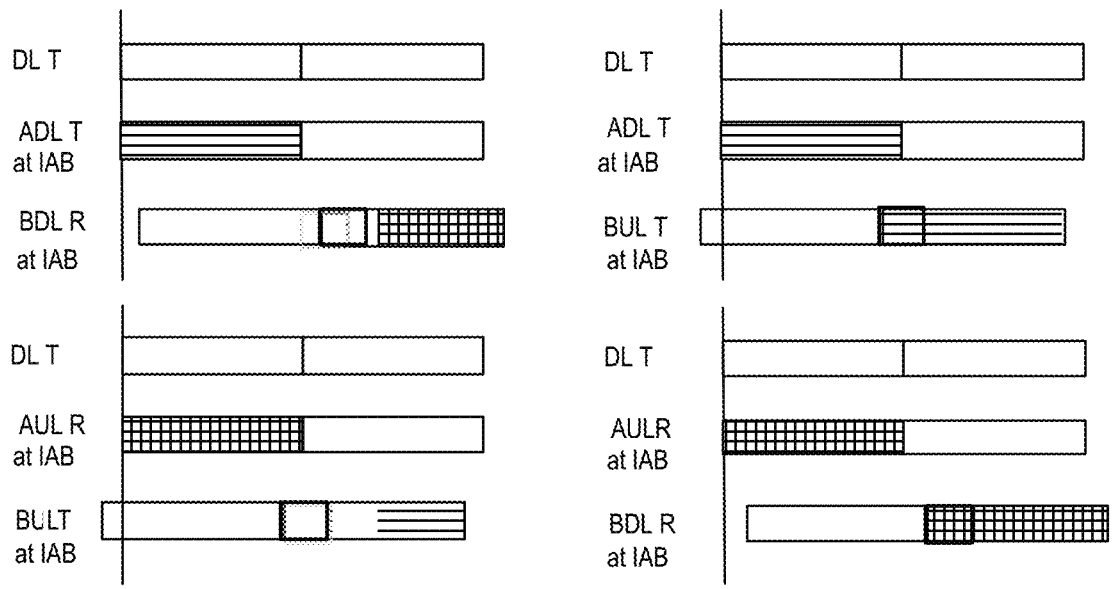
FIGS. 18A and 18B schematically illustrates switching cases in Time Division Duplex (TDD) system according to some embodiments of the present disclosure.
FIGS. 19A and 19B schematically illustrate transmission scenarios corresponding to those cases as illustrated in FIGS. 18A and 18B according to some embodiments of the present disclosure, wherein DL transmissions are aligned across IAB nodes and IAB-donor nodes.

FIG. 18A illustrates four transmission cases of switching from an access link to a backhaul link in TDD mode according some embodiments of the present disclosure. As illustrated in FIG. 18A, the first one is switching when the AL ending symbol is for transmission "T" (a downlink symbol) at the IAB-node and the BH starting symbol is for reception "R" (a flexible or downlink symbol) at the IAB-node. The second one is switching when the AL ending symbol is for transmission "T" (a downlink symbol) at the IAB-node and the BH starting symbol is for transmission "T" (a flexible or uplink symbol) at the IAB-node. The third one is switching when the AL ending symbol is for reception "R" (an uplink symbol) at the IAB-node and the BH starting symbol is for transmission "T" (a flexible or uplink symbol) at the IAB-node. The fourth one is switching when the AL ending symbol is for reception "R" (an uplink symbol) at the IAB-node and the BH starting symbol is for reception "R" (a flexible or downlink symbol) at the IAB-node if the panel switching is longer than the allowed delay.

FIG. 18B illustrates four transmission cases of switching from a backhaul link to an access link in TDD mode according to some embodiments of the present disclosure. As illustrated in FIG. 18B, the first one is switching when the BH ending symbol is for reception "R" (a flexible or downlink symbol) at the IAB-node and the AL starting symbol is for transmission "T" (a downlink symbol) at the IAB-node. The second one is switching when the BH ending symbol is for reception "R" (a flexible or downlink symbol) at the IAB-node and the AL starting symbol is for reception "R" (an uplink symbol) at the IAB-node. The third one is switching when the BH ending symbol is for transmission "T" (a flexible or uplink symbol) at the IAB-node and the AL starting symbol is for transmission "T" (a downlink symbol) at the IAB-node. The fourth one is switching when the BH ending symbol is for transmission "T" (a flexible or uplink symbol) at the IAB-node and the AL starting symbol is for reception "R" (an uplink) at the IAB-node.

It shall be appreciated that FIG. 18A and FIG. 18B respectively illustrate switching from an access link to a backhaul link and switching from a backhaul link to an access link. In fact, in real data transmission, the switching often occurs in a pairing manner. And also, in embodiments of the present disclosure, it is mainly directed to switching at start and end of a backhaul link.

Figure 19B:
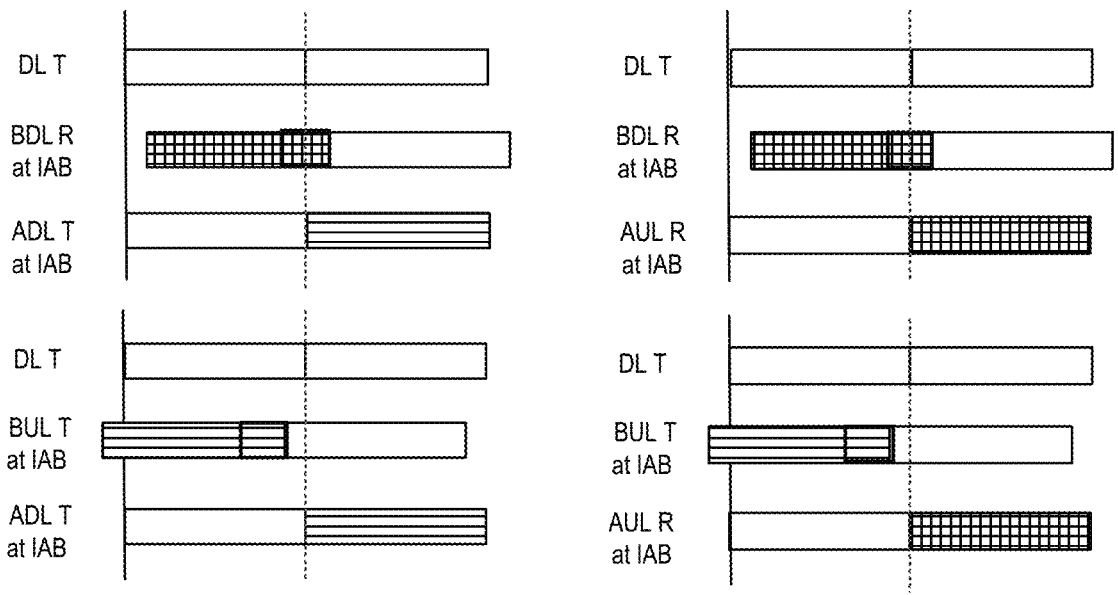

FIG. 19A schematically illustrates four transmission scenarios corresponding to four transmission cases as illustrated in FIG. 18A, wherein DL transmissions are aligned across IAB nodes and IAB-donor nodes. In such a case, the guard period could be set at starting symbols of the backhaul slot as indicated by the solid blocks illustrated in FIG. 19A. FIG. 19B schematically illustrates four transmission scenarios corresponding to four transmission cases as illustrated in FIG. 18B, wherein DL transmissions are aligned across IAB nodes and IAB-donor nodes. In such a case, the guard period could be set at the ending symbols of the backhaul slot as indicated by the solid blocks illustrated in FIG. 19B. From FIGS. 19A and 19B, it can be seen that if there is a time gap (due to propagation delay or time advance) between access link and the backhaul link, the guard period within the backhaul slot could be reduced by a predetermined value of the time gap; if there is a time overlapping (due to propagation delay or time advance) between access link and the backhaul link, the guard period within the backhaul slot could be increased by a predetermined value of time overlapping. Thus, the first network device like IAB-donor or a parent node may configure one of the slot formats as illustrated in for example FIGS. 8 and 16, and G1 and G2 may have different values based on a configuration signaling from the first network device or a predetermined table.

Figure 20A:
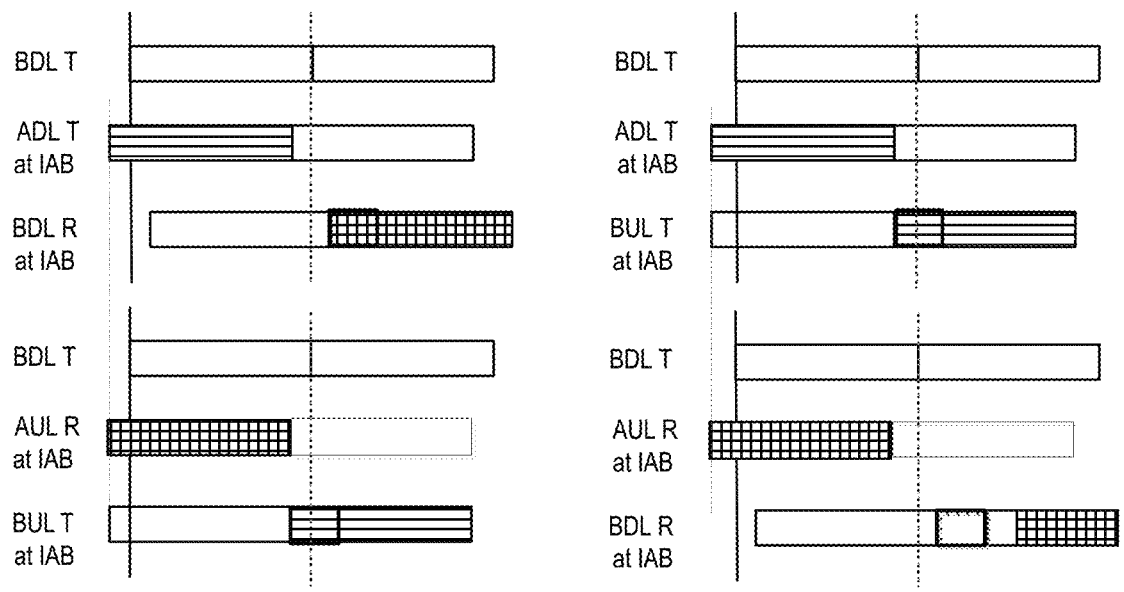
FIGS. 20A and 20B schematically illustrate transmission scenarios corresponding to those cases as illustrated in FIGS. 18A and 18B according to some embodiments of the present disclosure, wherein DL transmission and UL transmission are aligned at an IAB node.
Figure 20B:
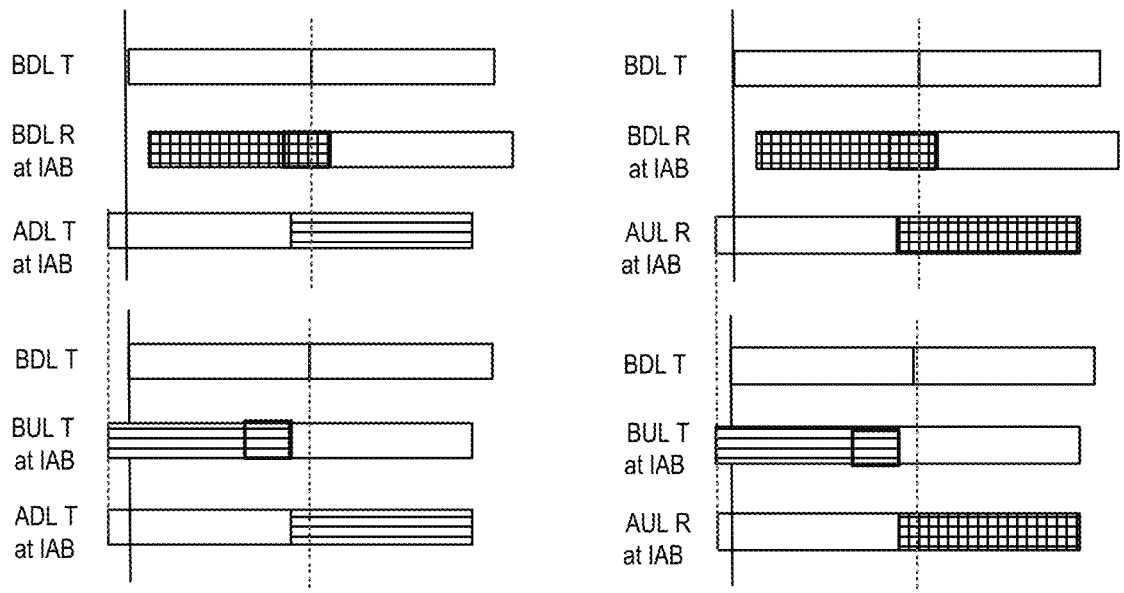

FIG. 20A schematically illustrates four transmission scenarios corresponding to four transmission cases as illustrated in FIG. 18A, wherein DL transmission and UL transmission are aligned at an IAB node (UE normal TA). In such a case, the guard period could be set at starting symbols of the backhaul slot as indicated by the solid blocks illustrated in FIG. 20. FIG. 20B schematically illustrates four transmission scenarios corresponding to four transmission cases as illustrated in FIG. 18B, wherein DL transmission and UL transmission are aligned at an IAB node. In such a case, the guard period could be set at the ending symbols of the backhaul slot as indicated by the solid blocks illustrated in FIG. 20B. Similarly, in FIGS. 20A and 20B, the guard period within the backhaul slot could be reduced by, if there is a time gap (due to propagation delay or time advance) between access link and the backhaul link, a predetermined value of the time gap, while the guard period within the backhaul slot could be increased by, if there is a time overlapping (due to propagation delay or time advance) between access link and the backhaul link, a predetermined value of the time overlapping. Thus, the first network device like IAB-donor or parent node may configure one of the slot formats as illustrated in for example FIGS. 8 and 16, and G1 and G2 may have different values based on a configuration signaling from the first network device or a predetermined table.

Figure 21A:
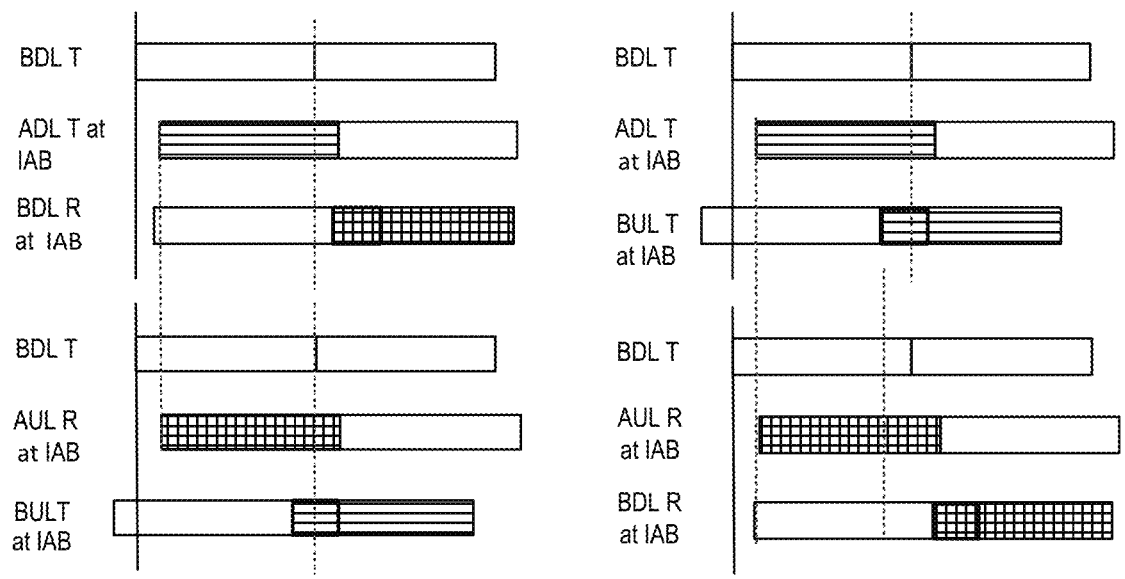
FIGS. 21A and 21B schematically illustrate transmission scenarios corresponding to those cases as illustrated in FIGS. 18A and 18B according to some embodiments of the present disclosure, wherein DL reception and UL reception are aligned at an IAB node.
Figure 21B:
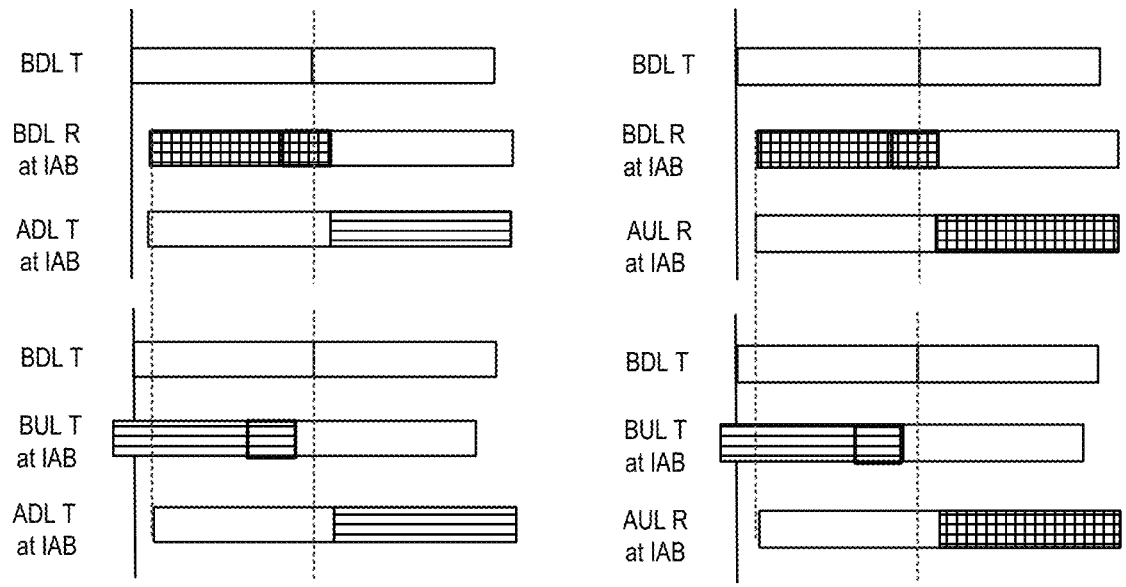

FIG. 21A schematically illustrates four transmission scenarios corresponding to four transmission cases as illustrated in FIG. 18A wherein DL reception and UL reception are aligned at an IAB node. In such a case, the guard period could be set at starting symbols of the backhaul slot as indicated by the solid blocks illustrated in FIG. 21A. FIG. 21B schematically illustrates four transmission scenarios corresponding to four transmission cases as illustrated in FIG. 18B, wherein DL reception and UL reception are aligned at an IAB node (UE normal TA). In such a case, the guard period could be set at the ending symbols of the backhaul slot as indicated by the solid blocks illustrated in FIG. 21B. Similarly, in FIGS. 21A and 21B, the guard period within the backhaul slot could be reduced by, if there is a time gap (due to propagation delay or time advance) between access link and the backhaul link, a predetermined value of the time gap, while the guard period within the backhaul slot could be increased by, if there is a time overlapping (due to propagation delay or time advance) between access link and the backhaul link, a predetermined value of the time overlapping. Thus, the first network device like IAB-donor or parent node may configure one of the slot formats as illustrated in for example FIGS. 8 and 16 and G1 and G2 may have different values based on a configuration signaling from the first network device or a predetermined table.

Figure 22A:
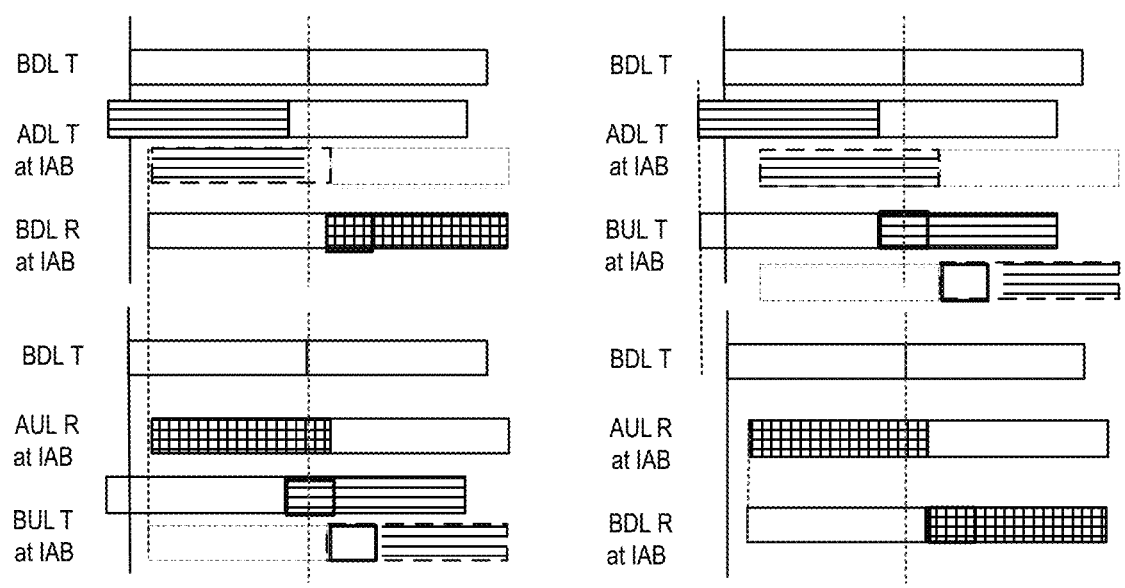
FIGS. 22A and 22B schematically illustrate transmission scenarios corresponding to those cases as illustrated in FIGS. 18A and 18B according to some embodiments of the present disclosure, wherein DL transmission and UL transmission are aligned at an IAB node during transmitting and DL reception and UL reception are aligned at an IAB node during receiving.
Figure 22B:
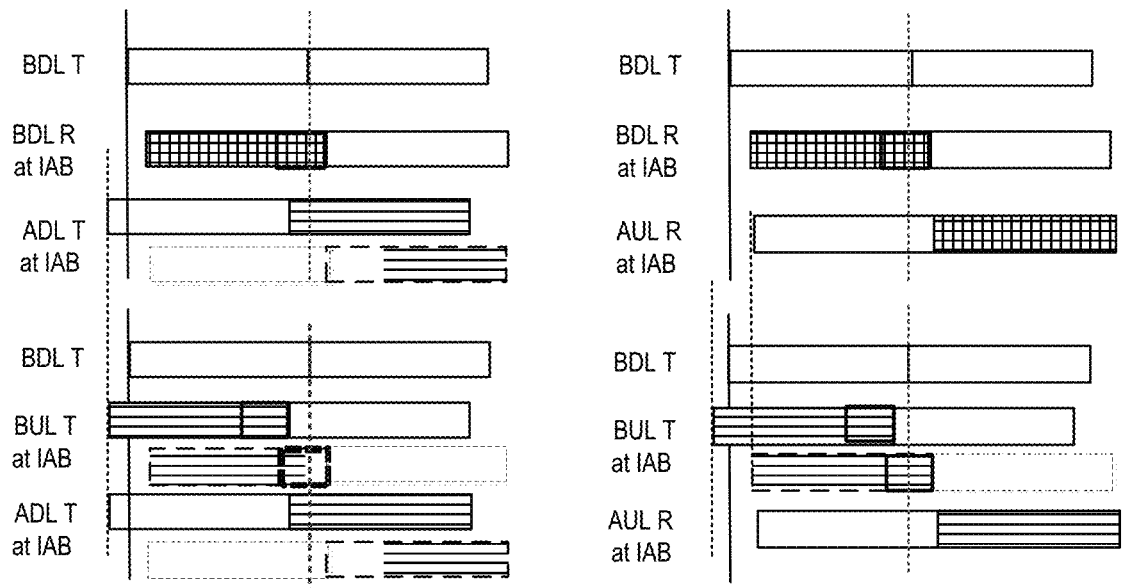

FIG. 22A schematically illustrates four transmission scenarios corresponding to four transmission cases as illustrated in FIG. 18A wherein DL transmission and UL transmission are aligned at an IAB node during transmitting and DL reception and UL reception are aligned at an IAB node during receiving. In such a case, there might occur a negative TA, but the guard period could still be set at starting symbols of the backhaul slot as indicated by the solid blocks illustrated in FIG. 22A. FIG. 22B schematically illustrates four transmission scenarios corresponding to four transmission cases as illustrated in FIG. 18B, wherein DL transmission and UL transmission are aligned at an IAB node during transmitting and DL reception and UL reception are aligned at an IAB node during receiving. In such a case, there might occur a negative TA, but the guard period could also be set at the ending symbols of the backhaul slot as indicated by the solid blocks illustrated in FIG. 22B. Similarly, in FIGS. 22A and 22B, the guard period within the backhaul slot could be reduced by, if there is a time gap (due to propagation delay or time advance) between access link and the backhaul link, a predetermined value of the time gap, while the guard period within the backhaul slot could be increased by, if there is a time overlapping (due to propagation delay or time advance) between access link and the backhaul link, a predetermined value of the time overlapping. Thus, the first network device like IAB-donor or parent node may configure one of the slot formats as illustrated in for example FIGS. 8 and 16 and G1 and G2 may have different values based on a configuration signaling from the first network device or a predetermined table.

Figure 23A:
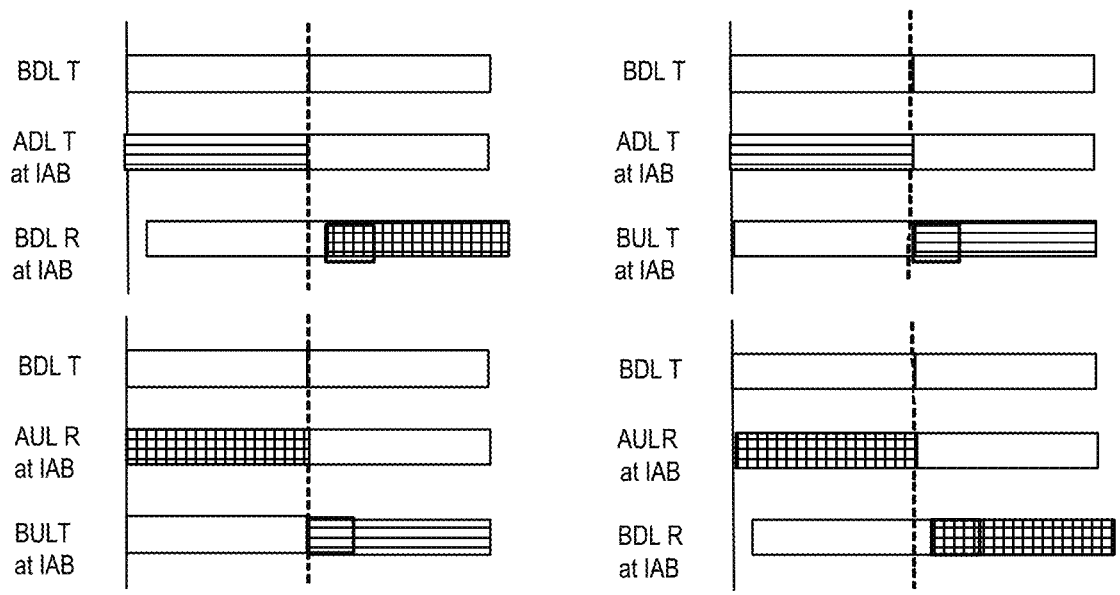
FIGS. 23A and 23B schematically illustrate transmission scenarios corresponding to those cases as illustrated in FIGS. 18A and 18B according to some embodiments of the present disclosure, wherein DL transmission and UL transmission are aligned at an IAB node and UL and DL transmission are aligned at an IAB node.
Figure 23B:
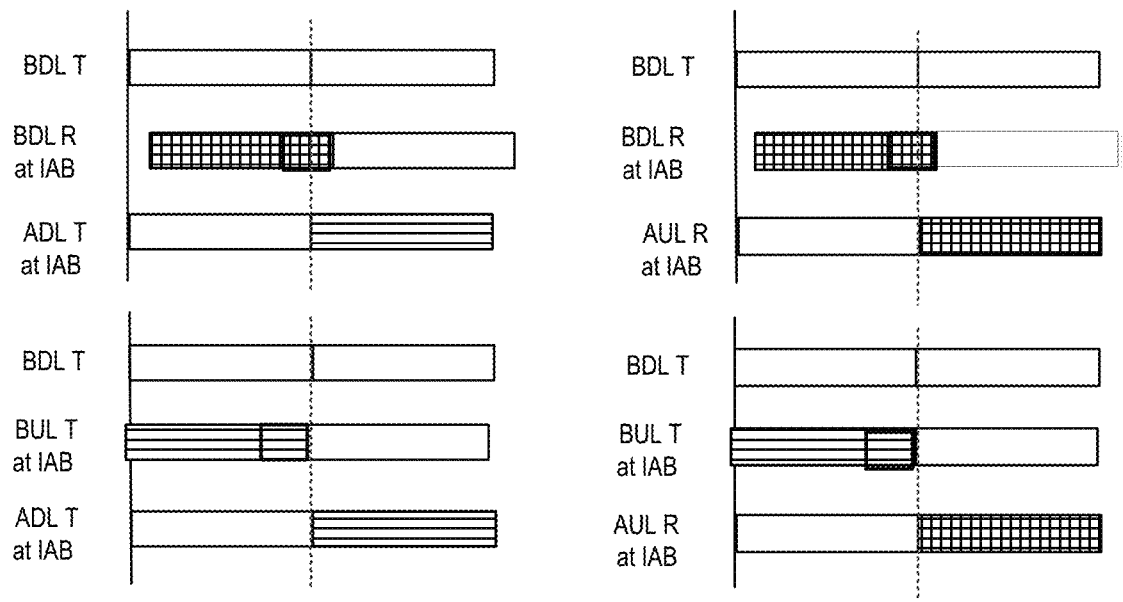

FIG. 23A schematically illustrates four transmission scenarios corresponding to four transmission cases as illustrated in FIG. 18A wherein DL transmission and UL transmission are aligned at an IAB node and UL and DL transmission are aligned at an IAB node. In such a case, the guard period could be set at starting symbols of the backhaul slot as indicated by the solid blocks illustrated in FIG. 23A. FIG. 23B schematically illustrates four transmission scenarios corresponding to four transmission cases as illustrated in FIG. 18B, wherein DL transmission and UL transmission are aligned at an IAB node and UL and DL transmission are aligned at an IAB node (TA/2 at BUL). In such a case, the guard period could be set at the ending symbols of the backhaul slot as indicated by the solid blocks illustrated in FIG. 23B. Similarly, in FIGS. 23A and 23B, the guard period within the backhaul slot could be reduced by, if there is a time gap (due to propagation delay or time advance) between access link and the backhaul link, a predetermined value of the time gap, while the guard period within the backhaul slot could be increased by, if there is a time overlapping (due to propagation delay or time advance) between access link and the backhaul link, a predetermined value of the time overlapping. Thus, the first network device like IAB-donor or parent node ay configure one of the slot formats as illustrated in for example FIGS. 8 and 16, and G1 and G2 may have different values based on a configuration signaling from the first network device or a predetermined table.

Figure 24A:
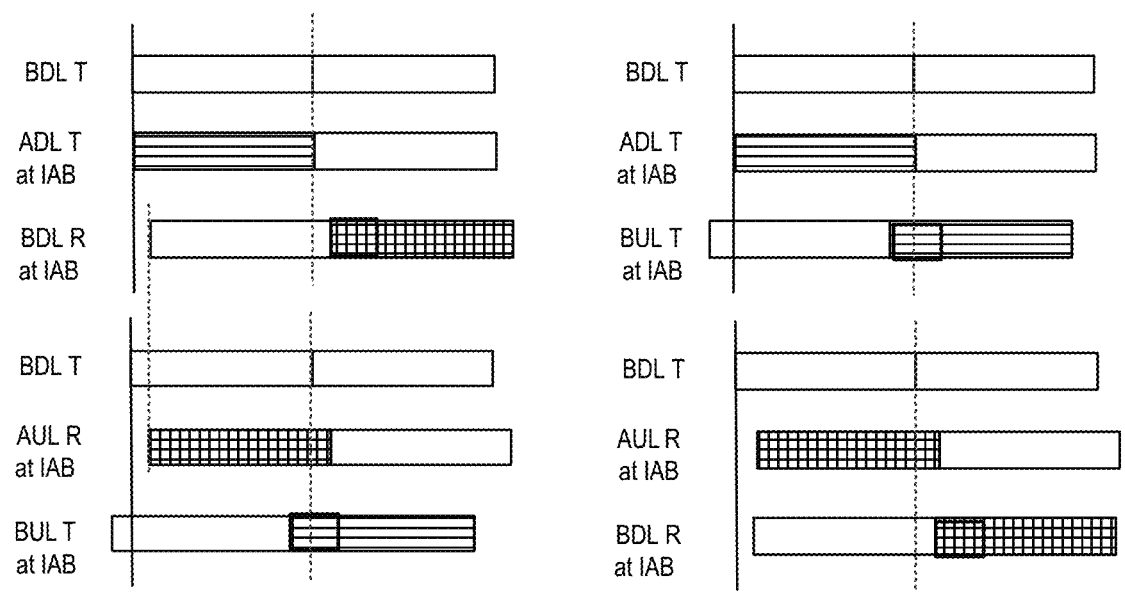
FIGS. 24A and 24B schematically illustrate transmission scenarios corresponding to those cases as illustrated in FIGS. 18A and 18B according to some embodiments of the present disclosure, wherein DL transmissions are aligned across IAB nodes and IAB-donor nodes and DL reception and UL reception are aligned at an IAB node.
Figure 24B:
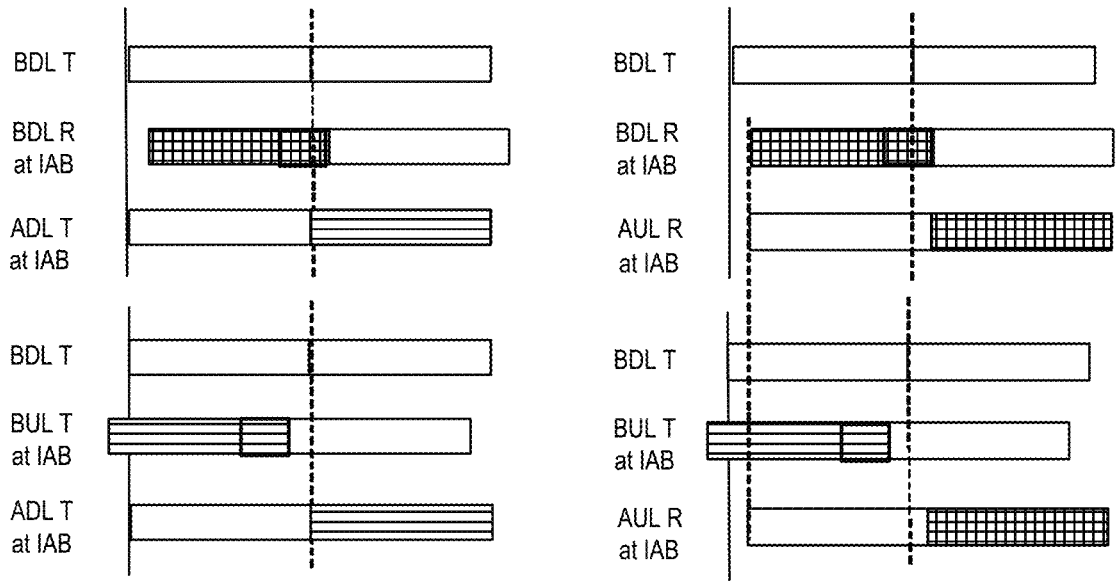

FIG. 24A schematically illustrates four transmission scenarios corresponding to four transmission cases as illustrated in FIG. 18A wherein DL transmissions are aligned across IAB nodes and IAB-donor nodes and DL reception and UL reception are aligned at an IAB node. In such a case, the guard period could be set at starting symbols of the backhaul slot as indicated by the solid blocks illustrated in FIG. 24A. FIG. 24B schematically illustrates four transmission scenarios corresponding to four transmission cases as illustrated in FIG. 18B, wherein DL transmissions are aligned across IAB nodes and IAB-donor nodes and DL reception and UL reception are aligned at an IAB node (access negative TA). In such a case, the guard period could be set at the ending symbols of the backhaul slot as indicated by the solid blocks illustrated in FIG. 24B. Similarly, in FIGS. 24A and 24B, the guard period within the backhaul slot could be reduced by, if there is a time gap (due to propagation delay or time advance) between access link and the backhaul link, a predetermined value of the time gap, while the guard period within the backhaul slot could be increased by, if there is a time overlapping (due to propagation delay or time advance) between access link and the backhaul link, a predetermined value of the time overlapping. Thus, the first network device like IAB-donor or parent node configure one of the slot formats as illustrated in for example FIGS. 8 and 16 and G1 and G2 may have different values based on a configuration signaling from the first network device or a predetermined table.

Based on the proposed guard period setting, the second network device could perform switching between the access link and the backhaul link based on the link configuration and the indicated slot format. It shall also be appreciated that FIGS. 19A to 24A and FIG. 19B to 24B respectively illustrate switching from an access link to a backhaul link and switching from a backhaul link to an access link. In actual transmission, the switch might occur at a starting symbol and an ending symbol of a backhaul slot. This means that the switching will be a combination of a scenario illustrated in one of FIG. 19A to 24A and another scenario illustrated in a corresponding one of FIGS. 19B to 24B. In such a case, one of slot formats as illustrated in any of FIGS. 8 to 12 can be used. In other words, the first network device may configure one of the slot formats by means of GC-PDCCH. In addition, if the backlink has information about the slot format used in the access link, a slot format illustrated in FIG. 16 can also be used.

Figure 25:
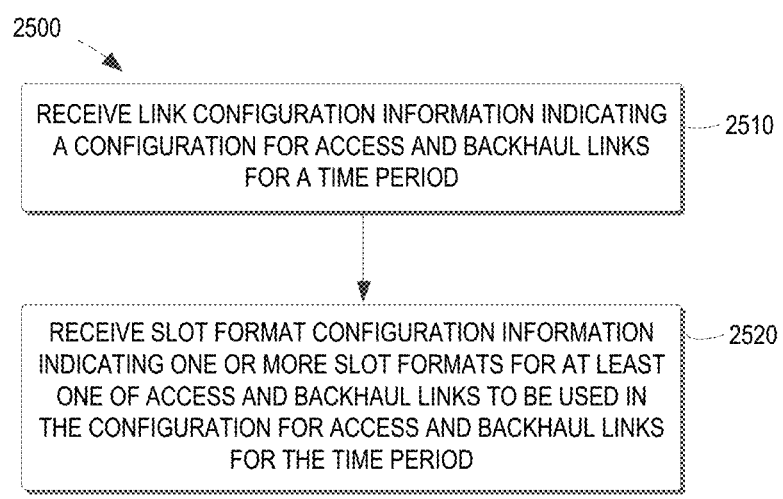
FIG. 25 schematically illustrates a flow chart of a method for receiving slot format indication at a second network node (for example IAB-node) according to some embodiments of the present disclosure.

FIG. 25 schematically illustrates a flow chart of a method for receiving slot format indication according to some embodiments of the present disclosure. The method may be implemented at a second network device such as IAB node as a relay or any other relay node.

As illustrated in FIG. 25, in step 2510, the second network device may receive link configuration information which indicates a configuration for access and backhaul links for a time period. The link configuration means resource allocation for access and backhaul links for the time period, for example indicating that each slot in the time period is an access link or a backhaul link. In other words, the link configuration can be a slot level configuration. The link configuration information is used to indicate the link configuration to the second network device for example the one functioning as IAB-node.

A link configuration information can be in a form of, for example, a bitmap. For example, "0" in the bitmap indicates a slot for access link, "1" in the bitmap indicates slot for a backhaul link and vice versa. In some embodiments of the present disclosure, the second network device like the IAB-node may receive link configuration information in form of bitmap, from which the second network device like the IAB-node could know the link configuration for access and backhaul link to be used during the time period.

In some embodiments of the present disclosure, the link configuration information can be informed to the second network device like IAB-node in two-layer signaling, for example as illustrated in FIGS. 5 and 6. First, a link configuration set indication can be received at the second network device, which indicates a set of available configurations for the access and backhaul links for the time period, as illustrated in FIG. 5. Then, a link configuration activation indication may be further received at the second network device, and in response to such a link configuration activation indication, the second network device may activate one of the set of available configurations as indicated in the link configuration activation indication, as illustrated in FIG. 6.

Reference is made back to FIG. 25, in step 2520, the second network device like IAB-node may further receive slot format configuration information, wherein the slot format configuration information indicates one or more slot format to be used in the configuration for access and backhaul links for the time period. The slot format used herein denotes uplink and downlink configuration for symbols within a slot. The slot format can be configured dynamically or semi-dynamically. For example, the slot format can be configured by means of downlink control channel such as GC-PDCCH which is a robust control channel and could transmit information accurately. An example slot format indication is illustrated in FIG. 7, which illustrates SF1, SF2, and SF3 indicated by SFI carried in GC-PDCCH, which may indicate slot formats to be respectively used in the backhaul slot in the activated link configuration.

In some embodiments of the present disclosure, the slot format may include a guard period to ensure switching between the backhaul link and the access link. The guard period may be set at any of a starting symbol within a slot; an ending symbol within a slot; and both the starting symbol and the ending symbol within a slot. FIGS. 8, 9, 10, 11, and 13 illustrate some example slot formats containing guard period at both the starting symbol and the ending symbol of a slot in TDD mode; FIG. 16 illustrates some example slot formats containing guard period at either the starting symbol or the ending symbol of a slot. In addition, FIG. 17C illustrates some example slot format containing guard period at both the starting symbol and the ending symbol of a slot in FDD mode.

In some embodiments of the present disclosure, the guard period may have a fixed time length for all cases. In some other embodiments of the present disclosure, the number of symbols for the guard period is dependent on subcarrier spacing. For example, for SCS=15 KHz, G could be 1F in the backhaul link; for SCS=30 KHz, G could be 1F to 2F in the backhaul link; for SCS=$15*2^u$ KHz, G could be 1F to $1*2^u$ F in backhaul link. In some embodiments of the present disclosure, the guard period may have a time length dependent on a timing alignment mode of link transmission, as illustrated in FIGS. 19A to 24B.

Hereinabove, the solutions of the present disclosure performed at the second network device are described in brief with reference to FIG. 25. At the second network device, the second network device may receive configuration information and/or indications from the first network device and obtain the information contained therein to perform the transmission based thereon. Most of operations at the second network device are corresponding to those at the terminal device and thus for some details of operations, one may refer to description with reference to FIGS. 4 to 24B

Figure 26:
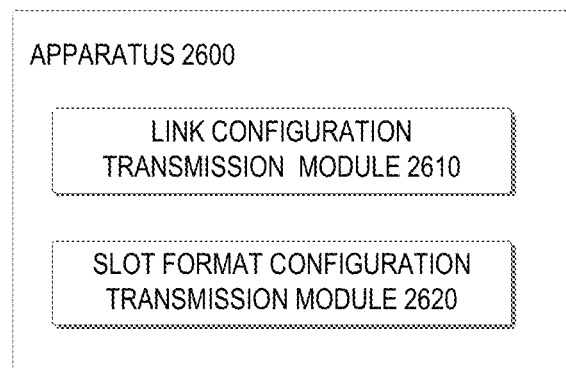
FIG. 26 schematically illustrates a block diagram of an apparatus for uplink resource mapping in a wireless communication system according to some embodiments of the present disclosure.

FIG. 26 schematically illustrates a block diagram of an apparatus for slot format configuration in a wireless communication system according to some embodiments of the present disclosure. The apparatus 2600 can be implemented at a base station (for example gNB functioning as an IAB-donor) or any other network device.

As illustrated in FIG. 26, the apparatus 2600 may include a link configuration transmission module 2610 and a slot format configuration transmission module 2620. The link configuration transmission module 2610 may be configured to transmit link configuration information indicating a configuration for access and backhaul links for a time period. The slot format configuration transmission module 2620 may be configured to transmit slot format configuration information indicating one or more slot formats for at least one of the access and backhaul links to be used in the configuration for access and backhaul links for the time period.

In some embodiments of the present disclosure, the link configuration transmission module 2610 may be further configured to transmit a link configuration set indication indicating a set of available configurations for the access and backhaul links for the time period. The link configuration transmission module 2610 may be further configured to transmit a link configuration activation indication to activate one of the set of available configurations.

In some embodiments of the present disclosure, the link configuration transmission module 2610 may be configured to transmit the link configuration set indication by a radio resource control signaling. Additionally or alternatively, the link configuration transmission module 2610 may be configured to transmit the link configuration activation indication in MAC-CE. Additionally or alternatively, a slot format configuration transmission module 2620 may be further configured to transmit the slot format configuration information on a downlink control channel.

In some embodiments of the present disclosure, the slot format may include a guard period at any of: a starting symbol within a slot; an ending symbol within a slot; and both the starting symbol and the ending symbol within a slot.

In some embodiments of the present disclosure, the guard period may have a fixed time length. In some embodiments of the present disclosure, the number of symbols for the guard period may be dependent on subcarrier spacing. In some embodiments of the present disclosure, the guard period may have a time length dependent on a timing alignment mode of link transmission.

In some embodiments of the present disclosure, guard periods at the staring symbol and at the ending symbol may have different time lengths.

In some embodiments of the present disclosure, the slot format configuration information may indicate one or more slot formats for one or more backhaul links in the configuration for access and backhaul links for the time period.

Figure 27:
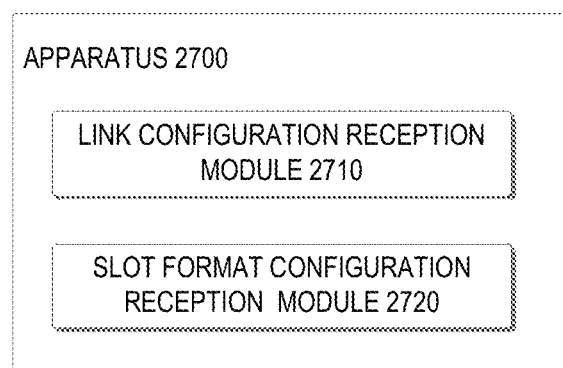
FIG. 27 schematically illustrates a block diagram of an apparatus 2700 for receiving slot format configuration according to some embodiments of the present disclosure.

FIG. 27 schematically illustrates a block diagram of an apparatus 2700 for receiving slot format configuration according to some embodiments of the present disclosure. The apparatus 2700 can be implemented at a second network device (for example an IAB-node as a relay) or any other relay node.

As illustrated in FIG. 2700, the apparatus 2700 may include a link configuration reception module 2710 and a slot format configuration reception module 2720. The link configuration reception module 2710 may be configured to receive link configuration information indicating a configuration for access and backhaul links for a time period. The slot format configuration reception module 2720 is configured to receive slot format configuration information indicating one or more slot formats for at least one of the access and backhaul links to be used in the configuration for access and backhaul links for the time period.

In some embodiments of the present disclosure, the link configuration reception module 2710 is further configured to receive a link configuration set indication indicating a set of available configurations for the access and backhaul links for the time period. The link configuration reception module 2710 is further configured is configured to receive a link configuration activation indication activating one of the set of available configurations.

In some embodiments of the present disclosure, the link configuration reception module 2710 may be configured to receive the link configuration set indication in a radio resource control signaling. Additionally or alternatively, the link configuration reception module 2710 may be configured to receive the link configuration activation indication in MAC-CE. Additionally or alternatively, a slot format configuration reception module 2720 may be further configured to receive the slot format configuration information on a downlink control channel.

In some embodiments of the present disclosure, the slot format may include a guard period at any of: a starting symbol within a slot; an ending symbol within a slot; and both the starting symbol and the ending symbol within a slot.

In some embodiments of the present disclosure, the guard period may have a fixed time length. In some embodiments of the present disclosure, the number of symbols for the guard period may be dependent on subcarrier spacing. In some embodiments of the present disclosure, the guard period may have a time length dependent on a timing alignment mode of link transmission.

In some embodiments of the present disclosure, guard periods at the staring symbol and at the ending symbol may have different time lengths.

In some embodiments of the present disclosure, the slot format configuration information may indicate one or more slot formats for one or more backhaul links in the configuration for access and backhaul links for the time period.

Hereinabove, apparatuses 2600 to 2700 are described with reference to FIGS. 26 to 27 in brief. It can be noticed that the apparatuses 2600 to 2700 may be configured to implement functionalities as described with reference to FIGS. 4 to 25. Therefore, for details about the operations of modules in these apparatuses, one may refer to those descriptions made with respect to the respective steps of the methods with reference to FIGS. 4 to 25.

It is further noticed that components of the apparatuses 2600 to 2700 may be embodied in hardware, software, firmware, and/or any combination thereof. For example, components of apparatuses 2600 to 2700 may be respectively implemented by a circuit, a processor or any other appropriate selection device.

Those skilled in the art will appreciate that the aforesaid examples are only for illustration not limitation and the present disclosure is not limited thereto; one can readily conceive many variations, additions, deletions and modifications from the teaching provided herein and all these variations, additions, deletions and modifications fall the protection scope of the present disclosure.

In addition, in some embodiment of the present disclosure, apparatuses 2600 to 2700 may include at least one processor. The at least one processor suitable for use with embodiments of the present disclosure may include, by way of example, both general and special purpose processors already known or developed in the future. Apparatuses 2600 to 2700 may further include at least one memory. The at least one memory may include, for example, semiconductor memory devices, e.g., RAM, ROM, EPROM, EEPROM, and flash memory devices. The at least one memory may be used to store program of computer executable instructions. The program can be written in any high-level and/or low-level compliable or interpretable programming languages. In accordance with embodiments, the computer executable instructions may be configured, with the at least one processor, to cause apparatuses 2600 to 2700 to at least perform operations according to the method as discussed with reference to FIGS. 4 to 25 respectively.

Figure 28:
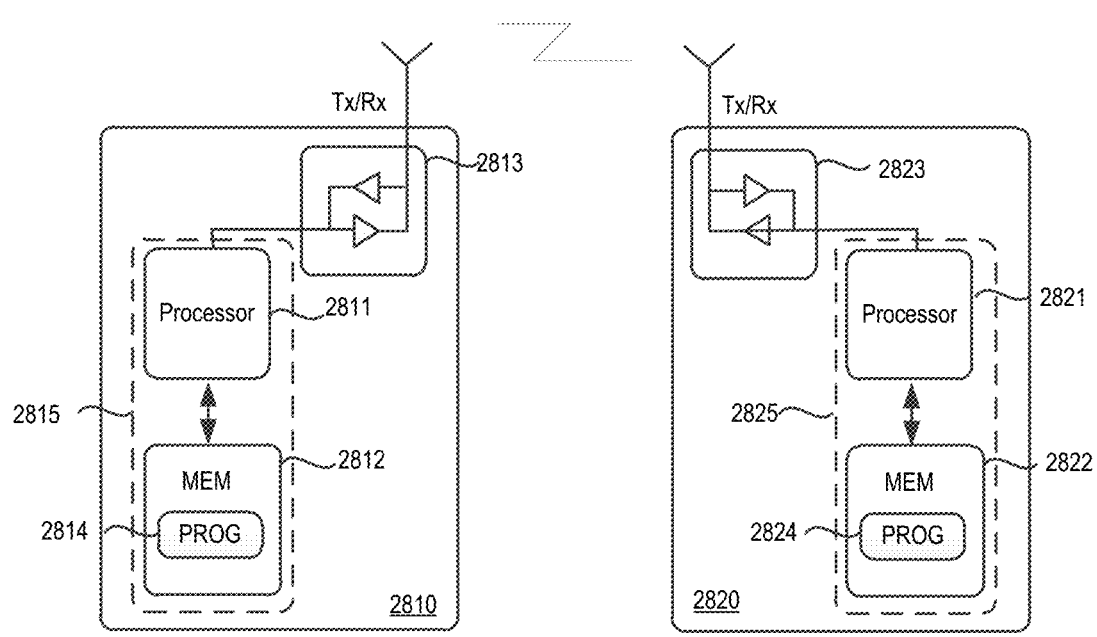
FIG. 28 schematically illustrates a simplified block diagram of an apparatus 2810 that may be embodied as or comprised in a first network device like an IAB-donor or a parent node, and an apparatus 2820 that may be embodied as or comprised in a second network device like IAB-node as a relay as described herein.

FIG. 28 schematically illustrates a simplified block diagram of an apparatus 2810 that may be embodied as or comprised in a first network device like IAB-donor or a parent node and an apparatus 2820 that may be embodied as or comprised in a second network device like an IAB-node as described herein.

The apparatus 2810 comprises at least one processor 2811, such as a data processor (DP) and at least one memory (MEM) 2812 coupled to the processor 2811. The apparatus 2810 may further include a transmitter TX and receiver RX 2813 coupled to the processor 2811, which may be operable to communicatively connect to the apparatus 2820. The MEM 2812 stores a program (PROG) 2814. The PROG 2814 may include instructions that, when executed on the associated processor 2811, enable the apparatus 2810 to operate in accordance with embodiments of the present disclosure, for example method 400. A combination of the at least one processor 2811 and the at least one MEM 2812 may form processing means 2815 adapted to implement various embodiments of the present disclosure.

The apparatus 2820 comprises at least one processor 2821, such as a DP, and at least one MEM 2822 coupled to the processor 2821. The apparatus 2820 may further include a suitable TX/RX 2823 coupled to the processor 2821, which may be operable for wireless communication with the apparatus 2810. The MEM 2822 stores a PROG 2824. The PROG 2824 may include instructions that, when executed on the associated processor 2821, enable the apparatus 2820 to operate in accordance with the embodiments of the present disclosure, for example the method 2500. A combination of the at least one processor 2821 and the at least one MEM 2822 may form processing means 2825 adapted to implement various embodiments of the present disclosure.

Various embodiments of the present disclosure may be implemented by computer program executable by one or more of the processors 2811, 2821, software, firmware, hardware or in a combination thereof.

The MEMs 2812 and 2822 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 2811 and 2821 may be of any type suitable to the local technical environment, and may include one or more of general purpose computers, special purpose computers, microprocessors, digital signal processors DSPs and processors based on multicore processor architecture, as non-limiting examples.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a network device, the method comprising:
    transmitting, to an Integrated Access Backhaul (IAB) node, first information and second information, the IAB node being connected to the network device and at least one of a child node and a User Equipment (UE),
    wherein the first information indicates a first slot configuration for a first backhaul link between the IAB node and the network device, and
    wherein the second information indicates one of:
        a second slot configuration for an access link between the IAB node and the UE, and
        a third slot configuration for a second backhaul link between the IAB node and the child node; and
    indicating to the IAB node, a first guard period and a second guard period, the first guard period and the second guard period respectively comprising a starting symbol in a beginning and an ending symbol in an end of a slot, wherein the IAB node is configured to, during the first guard period and the second guard period, perform switches of operation between the first backhaul link and one of the second backhaul link, and the access link.

2. The method of claim 1, wherein the network device is a parent node.

3. The method of claim 1, wherein the child node is a second IAB node.

4. The method of claim 1, wherein one of the first slot configuration, the second slot configuration, and the third slot configuration indicates an uplink symbol located prior to a downlink symbol.

5. The method of claim 1, wherein, the switches of operation each comprise one of the following plurality of scenarios:
    switching from one of reception and transmission in the first backhaul link to one of transmission and reception in the one of the second backhaul link and the access link; and
    switching from one of reception and transmission in the one of the second backhaul link and the access link to one of transmission and reception in the first backhaul link.

6. The method of claim 5, wherein a separate value for a number of symbols of the first guard period and the second guard period is specified, respectively, according to each of the plurality of scenarios.

7. A method performed by an Integrated Access Backhaul (IAB) node, the method comprising:
    receiving, from a network device, first information and second information,
    wherein the first information indicates a first slot configuration for a first backhaul link between the IAB node and the network device, and
    wherein the second information indicates one of:
        a second slot configuration for an access link between the IAB node and a User Equipment (UE), and
        a third slot configuration for a second backhaul link between the IAB node and the child node; and
    receiving, from the network device, information indicating a first guard period and a second guard period, the first guard period and the second guard period respectively comprising a starting symbol in a beginning and an ending symbol in an end of a slot, wherein the IAB node is configured to, during the first guard period and the second guard period, perform switches of operation between the first backhaul link and one of: the second backhaul link, and the access link,
    wherein the IAB node is connected to the network device and at least one of the child node and the UE.

8. The method of claim 7, wherein the child node is a second IAB node.

9. The method of claim 7, wherein one of the first slot configuration, the second slot configuration, and the third slot configuration indicates an uplink symbol located prior to a downlink symbol.

10. The method of claim 7,
    wherein, switches of operation each comprise one of the following plurality of scenarios:
        switching from one of reception and transmission in the first backhaul link to one of transmission and reception in the one of the second backhaul link and the access link;
        switching from one of reception and transmission in the one of the second backhaul link and the access link to one of transmission and reception in the first backhaul link.

11. The method of claim 10, wherein, wherein a separate value for a number of symbols of the first guard period and the second guard period is specified, respectively, according to each of the plurality of scenarios.

12. A network device, comprising:
    at least one memory configured to store instructions; and
    at least one processor configured to execute the instructions to:
        transmit, to an Integrated Access Backhaul (IAB) node, first information and second information, the IAB node being connected to the network device and at least one of a child node or a User Equipment (UE),
            wherein the first information indicates a first slot configuration for a first backhaul link between the IAB node and the network device; and
            wherein the second information indicates one of:
                a second slot configuration for an access link between the IAB node and the UE, and
                a third slot configuration for a second backhaul link between the IAB node and the child node; and
        indicate to the IAB node, a first guard period and a second guard period, the first guard period and the second guard period respectively comprising a starting symbol in a beginning and an ending symbol in an end of a slot, wherein the IAB node is configured to, during the first guard period and the second guard period, perform switches of operation between the first backhaul link and one of: the second backhaul link and the access link.

13. The network device of claim 12, wherein the network device is a parent node.

14. The network device of claim 12, wherein the child node is a second IAB device.

15. The network device of claim 12, wherein one of the first slot configuration, the second slot configuration, and the third slot configuration indicates an uplink symbol located prior to a downlink symbol.

16. The network device of claim 12,
wherein, the switches of operation each comprise one of the following plurality of scenarios:
switching from one of reception and transmission in the first backhaul link to one of transmission and reception in the one of the second backhaul link and the access link;
switching from one of reception and transmission in the one of the second backhaul link and the access link to one of transmission and reception in the first backhaul link.

17. An Integrated Access Backhaul (IAB) node, comprising:
at least one memory configured to store instructions; and
at least one processor configured to execute the instructions to:
receive, from a network device, first information and second information,
wherein the first information indicates a first slot configuration for a first backhaul link between the IAB node and the network device, and
wherein the second information indicates one of:
a second slot configuration for an access link between the IAB node and a User Equipment (UE), and
a third slot configuration for a second backhaul link between the IAB node and the child node; and
receive, from the network device, information indicating a first guard period and a second guard period, the first guard period and the second guard period respectively comprising a starting symbol in a beginning and an ending symbol in an end of a slot, wherein the IAB node is configured to, during the first guard period and the second guard period, perform a switches of operation between the first backhaul link and one of:
the second backhaul link and the access link,
wherein the IAB node is connected to the network device and at least one of the child node and the UE.

18. The IAB node of claim 17, wherein the child node is a second IAB node.

19. The IAB node of claim 17, wherein one of the first slot configuration, the second slot configuration, and the third slot configuration indicates an uplink symbol located prior to a downlink symbol.

20. The IAB node of claim 17, wherein, the switches of operation each comprise one of the following plurality of scenarios:
switching from one of reception and transmission in the first backhaul link to one of transmission and reception in the one of the second backhaul link and the access link;
switching from one of reception and transmission in the one of the second backhaul link and the access link to one of transmission and reception in the first backhaul lin.

21. The network device of claim 16, wherein a separate value for a number of symbols of the first guard period and the second guard period is specified, respectively, according to each of the plurality of scenarios.

22. The IAB node of claim 20, wherein a separate value for a number of symbols of the first guard period and the second guard period is specified, respectively, according to each of the plurality of scenarios.

* * * * *